(12) United States Patent
Sakai et al.

(10) Patent No.: US 7,796,962 B2
(45) Date of Patent: Sep. 14, 2010

(54) DIGITAL DEMODULATING APPARATUS, DIGITAL RECEIVER, CONTROLLING METHOD OF THE APPARATUS, COMPUTER PROGRAM PRODUCT, AND RECORDING MEDIUM RECORDING THEREON THE PRODUCT

(75) Inventors: Takae Sakai, Yao (JP); Nobuyoshi Kaiki, Nara (JP)

(73) Assignee: Sharp Kabushiki Kaisha, Osaki-Shi (JP)

( * ) Notice: Subject to any disclaimer, the term of this patent is extended or adjusted under 35 U.S.C. 154(b) by 676 days.

(21) Appl. No.: 11/822,530

(22) Filed: Jul. 6, 2007

(65) Prior Publication Data

US 2008/0074556 A1 Mar. 27, 2008

(30) Foreign Application Priority Data

Sep. 25, 2006 (JP) .............................. 2006-259593

(51) Int. Cl.
*H04B 1/18* (2006.01)
(52) U.S. Cl. .............. 455/188.1; 455/226.2; 455/343.1; 375/340
(58) Field of Classification Search ................. 455/150, 455/188.1, 195.1, 226.1, 226.2, 226.3, 334, 455/343.1; 375/259, 340
See application file for complete search history.

(56) References Cited

U.S. PATENT DOCUMENTS

| | | | | |
|---|---|---|---|---|
| 6,782,239 | B2 * | 8/2004 | Johnson et al. | 455/42 |
| 6,999,735 | B2 * | 2/2006 | Khorram | 455/115.1 |
| 7,149,488 | B2 * | 12/2006 | Khorram | 455/266 |
| 7,580,482 | B2 * | 8/2009 | Endres et al. | 375/326 |
| 2006/0222098 | A1 * | 10/2006 | Sedarat et al. | 375/260 |

FOREIGN PATENT DOCUMENTS

JP 2005-311570 A 11/2005

* cited by examiner

*Primary Examiner*—Nhan Le
(74) *Attorney, Agent, or Firm*—Birch, Stewart, Kolasch & Birch, LLP

(57) ABSTRACT

A digital demodulating apparatus includes a tuner that selectively receives one of frequency bands, and a demodulator that demodulates a signal from the tuner. The apparatus further includes a measuring unit that measures on each carrier wave the intensity of noise to be contained in the signal from the tuner due to an interfering wave contained in the signal received by the tuner; a distribution estimating unit that estimates the distribution of interfering waves in at least one of the received frequency band and a frequency band neighboring the received frequency band, based on the distribution of noises in the frequency band measured on each carrier wave; a noise change deriving unit that derives a change in the intensity of noise to be contained in the signal from the tuner, to the power to be supplied to a circuit element; and a power updating unit that updates the value of the power to be supplied to the circuit element within a range in which the intensity of noise to be contained in the signal from the tuner is less than a noise reference value, based on the derived change in the intensity of noise to the power to supply.

12 Claims, 17 Drawing Sheets

DIGITAL DEMODULATING APPARATUS, DIGITAL RECEIVER, CONTROLLING METHOD OF THE APPARATUS, COMPUTER PROGRAM PRODUCT, AND RECORDING MEDIUM RECORDING THEREON THE PRODUCT

BACKGROUND OF THE INVENTION

1. Field of the Invention

The present invention relates to a digital demodulating apparatus, in particular, that receives a modulated signal and demodulates the received signal. The present invention also relates to a digital receiver, a controlling method of the demodulating apparatus, a computer program product, and a recording medium recording thereon the product.

2. Description of Related Art

An interfering wave contained in a signal received by a tuner may cause generation of noise in a signal to be output from the tuner. If the noise contained in the signal from the tuner is excessively intense, the signal from the tuner can not be demodulated. The intensity of the noise to be contained in the signal from the tuner depends on the amplitude of the interfering wave received by the tuner. Japanese Patent Unexamined Publication No. 2005-311570 discloses an apparatus that checks whether or not a signal contains an interfering wave.

The intensity of the noise to be contained in the signal from the tuner also depends on the power to be supplied to each circuit element constituting the tuner. Therefore, the power to be supplied to each circuit element must be controlled so that the noise to be contained in the signal from the tuner is not excessively intense. On the other hand, the power to be supplied to each circuit element is higher than necessary, it is undesirable because the power consumption of the tuner increases. Thus, the power to be supplied to each circuit element must be properly determined so that the noise to be contained in the signal from the tuner is not excessively intense and the power to be supplied to each circuit element is not higher than necessary. For this purpose, it is required to sufficiently grasp what the interfering wave contained in the signal received by the tuner is. However, the technique of the above Publication only checks whether or not an interfering wave exists. It is, therefore, insufficient for properly determining the power to be supplied to each circuit element.

SUMMARY OF THE INVENTION

An object of the present invention is to provide a digital demodulating apparatus in which an interfering wave contained in a signal received by a tuner is properly grasped to control the power to be supplied to each circuit element constituting the tuner; a digital receiver; a controlling method of the demodulating apparatus; a computer program product; and a recording method recording thereon the product.

According to an aspect of the present invention, a digital demodulating apparatus comprises a plurality of circuit elements constituting a tuner that selects a frequency band out of a plurality of frequency bands and receives the signal in the selected frequency band. Each signal is constituted by a plurality of carrier waves distributed in the frequency band. The apparatus further comprises a demodulator that demodulates a signal output from the tuner; a first measuring unit that measures the intensity of noise contained in the signal from the tuner due to an interfering wave contained in the signal received by the tuner, on each carrier wave distributed in the selected frequency band; a distribution estimating unit that estimates at least one of the distribution of interfering waves in the selected frequency band, and the distribution of interfering waves in a frequency band neighboring the selected frequency band, on the basis of the distributions of noises in the selected frequency band measured on each carrier wave by the first measuring unit; a noise change deriving unit that derives a change in the intensity of noise to be contained in the signal from the tuner, to the power to be supplied to one of the circuit elements, on the basis of the distribution of interfering waves estimated by the distribution estimating unit, and the intensity of noise measured by the first measuring unit; and a power updating unit that updates the value of the power to be supplied to the circuit element within a range in which the intensity of noise to be contained in the signal from the tuner is less than a noise reference value, on the basis of the change in the intensity of noise to the power to be supplied to the circuit element, derived by the noise change deriving unit.

According to another aspect of the present invention, there is provided a controlling method of a digital demodulating apparatus comprising a plurality of circuit elements constituting a tuner that selects a frequency band out of a plurality of frequency bands and receives the signal in the selected frequency band. Each signal is constituted by a plurality of carrier waves distributed in the frequency band. The apparatus further comprises a demodulator that demodulates a signal output from the tuner. The method comprises a first measuring step of measuring the intensity of noise contained in the signal from the tuner due to an interfering wave contained in the signal received by the tuner, on each carrier wave distributed in the selected frequency band; a distribution estimating step of estimating at least one of the distribution of interfering waves in the selected frequency band, and the distribution of interfering waves in a frequency band neighboring the selected frequency band, on the basis of the distributions of noises in the selected frequency band measured on each carrier wave by the first measuring step; a noise change deriving step of deriving a change in the intensity of noise to be contained in the signal from the tuner, to the power to be supplied to one of the circuit elements, on the basis of the distribution of interfering waves estimated by the distribution estimating step, and the intensity of noise measured by the first measuring step; and a power updating step of updating the value of the power to be supplied to the circuit element within a range in which the intensity of noise to be contained in the signal from the tuner is less than a noise reference value, on the basis of the change in the intensity of noise to the power to be supplied to the circuit element, derived by the noise change deriving step.

According to still another aspect of the present invention, there is provided a computer program product for a digital demodulating apparatus comprising a plurality of circuit elements constituting a tuner that selects a frequency band out of a plurality of frequency bands and receives the signal in the selected frequency band. Each signal is constituted by a plurality of carrier waves distributed in each frequency band. The apparatus further comprises a demodulator that demodulates a signal output from the tuner. The product causes the apparatus to execute a first measuring step of measuring the intensity of noise contained in the signal from the tuner due to an interfering wave contained in the signal received by the tuner, on each carrier wave distributed in the selected frequency band; a distribution estimating step of estimating at least one of the distribution of interfering waves in the selected frequency band, and the distribution of interfering waves in a frequency band neighboring the selected frequency band, on the basis of the distributions of noises in the selected frequency band measured on each carrier wave by the first measuring step; a noise change deriving step of deriving a change in the intensity of noise to be contained in the signal from the tuner, to the power to be supplied to one of the circuit elements, on the basis of the distribution of interfering waves estimated by the distribution estimating step, and the intensity of noise measured by the first measuring step; and a power updating step of updating the value of the power to be supplied to the circuit element within a range in which the intensity of noise to be contained in the signal from the tuner is less than a noise reference value, on the basis of the change in the intensity of noise to the power to be supplied to the circuit element, derived by the noise change deriving step.

According to the invention, a change in the intensity of noise to power to supply is grasped to control the power to supply, so that the noise does not exceed the reference value. When the distribution of interfering waves is related to the distribution of noises, the distribution of interfering waves can be grasped by grasping the distribution of noises. Because grasping the distribution of interfering waves leads to grasping the behavior of noises to be contained in the signal due to the interfering waves, a change in the intensity of noise to power to supply can be grasped. Thus, on the basis of the change in the intensity of noise to power to supply, the power to be supplied to the circuit element can properly be controlled so that the intensity of noise is suppressed to not more than the reference value and the power consumption of the tuner is not excessive.

In the present invention, the distribution estimating unit preferably estimates the distribution of interfering waves on the assumption that noises to be contained in the signal from the tuner are generated due to intermodulation distortions caused by the interfering waves. When the noises to be contained in the signal from the tuner are caused by intermodulation distortions, the distribution of interfering waves can accurately be grasped from the distribution of the noises. According to this feature, by using the relation between intermodulation distortions and interfering waves, the distribution of interfering waves can accurately be grasped from measurement results of noises.

In the present invention, the power updating unit preferably updates the power to be supplied to the circuit element to a lower value within the range in which the intensity of noise to be contained in the signal from the tuner is less than the noise reference value, when the intensity of noise being contained in the signal from the tuner is less than the noise reference value. According to this feature, by reducing the power to be supplied to the circuit element, the power consumption is properly reduced within a range in which noise does not exceed the reference value.

In the present invention, it is preferable that the noise change deriving unit comprises a relation storage unit that stores therein a relation between a change in the intensity of noise to be contained in an output signal from the circuit element, to the power to be supplied to the circuit element, and the distribution of interfering waves in a frequency band; and a noise change acquiring unit that acquires a change in the intensity of noise to be contained in the signal from the tuner, to the power to be supplied to the circuit element, on the basis of the distribution of interfering waves estimated by the distribution estimating unit, and information being stored in the relation storage unit, and the power updating unit updates the value of the power to be supplied to the circuit element, on the basis of the change in the intensity of noise to the power to be supplied to the circuit element, acquired by the noise change acquiring unit. According to this feature, by storing the relation between a change in the intensity of noise to power to supply, and the distribution of noises, it becomes possible by a simple construction to derive the change in the intensity of noise to power to supply.

In the present invention, it is preferable that interfering waves contained in the signal received by the tuner are at least one of analogue television broadcasting waves and digital television broadcasting waves distributed in a frequency band, and the distribution estimating unit comprises an interference judging unit that judges whether interfering waves being contained in a frequency band neighboring the selected frequency band, are analogue television broadcasting waves or digital television broadcasting waves. Because the signal distribution of analogue or digital television broadcasting waves is known, it can easily be decided from measured noises which of analogue and digital television broadcasting waves the interfering waves are. When it is once grasped which of analogue and digital television broadcasting waves the interfering waves are, it can accurately be grasped in what form the interfering waves are distributed in the frequency band. Thus, according to this feature, the accurate distribution of interfering waves can easily be grasped.

In the present invention, the distribution estimating unit preferably comprises an analogue wave judging unit that judges whether or not the selected frequency band contains analogue television broadcasting waves. According to this feature, it is judged whether or not the frequency band selectively received by the tuner contains analogue television broadcasting waves as interfering waves, and then, on the basis of the judgment result, a change in the intensity of noise to power to supply can properly be derived.

In the present invention, it is preferable that the power updating unit comprises a power deriving unit that derives a value of the power to be supplied to the circuit element, so that the intensity of noise to be contained in the signal from the tuner when the value of the power is supplied to the circuit element, is less then the noise reference value, on the basis of the distribution of interfering waves estimated by the distribution estimating unit; a period determining unit that determines a period during which the value of the power derived by the power deriving unit is to be supplied; a temporally power supplying unit that supplies to the circuit element the value of the power derived by the power deriving unit during the period determined by the period determining unit; and a second measuring unit that measures the intensity of noise contained in the signal from the tuner when the temporally power supplying unit supplies to the circuit element the value of the power derived by the power deriving unit, and the power updating unit updates the power to be supplied to the circuit element, to a value not less than the value derived by the power deriving unit, and less than the value before the update, when the intensity of noise measured by the second measuring unit is less than the noise reference value. According to this feature, a test power supply is actually performed to judge whether or not the resultant noises are less than the reference value, and then the power to supply is updated. Thus, the power to supply is updated within a range in which noise is more surely less than the reference value.

In the present invention, it is preferable that the apparatus further comprises an error correcting unit that corrects errors in the signal from the tuner, and the noise reference value is an upper limit value of the intensity of noise that can be corrected by the error correcting unit. According to this feature, the power to supply is controlled within a range in which the error correction can successfully be performed. Therefore, the power to supply is controlled within a range in which demodulation can properly be performed.

The present invention can be applied to various digital receivers such as cellular phones and digital television receivers, including therein reproducing means that reproduces at least one of characters, images, data such as computer programs, and sounds. Such a digital receiver acquires information on characters, images, data such as computer programs, or sounds, from a received signal which has been demodulated by a digital demodulating apparatus according to the present invention, and then the receiver reproduces the characters or the like. Because the digital demodulating apparatus according to the present invention is adopted in the digital receiver, the power consumption can be suppressed with suppressing the intensity of noise contained in an output signal from the tuner.

Computer program products according to the present invention can be distributed in a form of being recorded on computer-readable recording media including removable type recording media such as compact disc read only memory (CD-ROM) disks, flexible disks (FDs), and magneto optical (MO) disks, and fixed type recording media such as hard disks. Such computer program products can be also distributed by wired or wireless electric communication means via a communication network such as the Internet. Such a computer program product may not be exclusive to the digital demodulating apparatus. By using in combination with computer programs for channel select processing and digital demodulation processing, the computer program product may cause a general-purpose apparatus including therein a general-purpose processor and so on, to function as the digital demodulating apparatus.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1A:
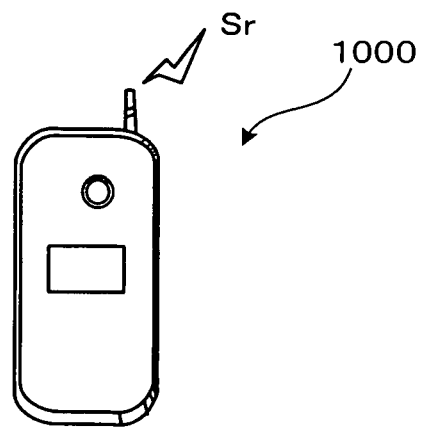
FIG. 1A is an external view of a cellular phone according to an embodiment of the present invention.
Figure 1B:
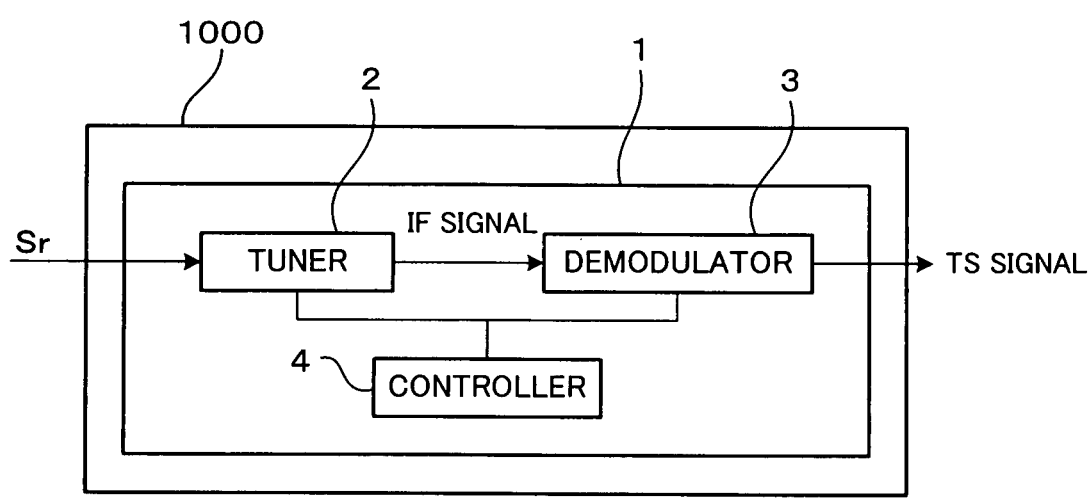
FIG. 1B is a block diagram showing a general constitution of a digital demodulating apparatus included in the cellular phone.

Hereinafter, a cellular phone according to a preferred embodiment of the present invention will be described. FIG. 1A shows an external view of a cellular phone 1000 according to the embodiment. FIG. 1B shows a general constitution of a digital demodulating apparatus included in the cellular phone 1000.

The cellular phone 1000 as a digital receiver according to the embodiment includes therein a digital demodulating apparatus 1. A signal Sr received by the cellular phone 1000 through its antenna is demodulated by the digital demodulating apparatus 1. Information on data of characters, an image, sound, or a program, is taken out from a demodulated signal output from the digital demodulating apparatus 1, and the data is reproduced. The characters, image, and so on, are provided to a user of the cellular phone 1000 through a not-shown display and a not-shown speaker provided on the phone 1000. In a modification, the digital demodulating apparatus 1 may be adopted in another digital receiver than such a cellular phone, for example, a digital television receiver, a wireless local area network (LAN) device, or a personal computer (PC) using wireless LAN.

The digital demodulating apparatus 1 includes therein a tuner 2, a demodulator 3, and a controller 4. The tuner 2 is electrically connected to the demodulator 3. The tuner 2 is also electrically connected to an antenna and applies channel select processing to a signal Sr received through the antenna. That is, the tuner 2 selects a single channel out of a number of channels contained in the signal Sr, and receives the single channel. The tuner 2 then converts the signal of the selectively received channel into an intermediate frequency (IF) signal, which is sent to the demodulator 3. The demodulator 3 receives the IF signal sent from the tuner 2, demodulates the IF signal, and outputs the demodulated signal. The demodulated signal is, for example, a so-called transport stream (TS) signal.

The digital demodulating apparatus 1 is made up of a number of circuit elements. If not otherwise specified in the below description, each circuit element may be constituted by a group of circuit components specialized so as to serve an independent function; or may be realized by a general-purpose processor and so on, and computer programs that make the hardware components such as the processor operate so as to serve the respective functions as will be described later. In the latter case, each circuit element is realized by combining the hardware components and the computer programs.

Next will be described a signal to be received by the cellular phone 1000. As an example of the embodiment, a case will be described below wherein a transmission system according to Japanese digital terrestrial broadcasting is adopted for the transmission of the signal to be received by the cellular phone 1000. For Japanese digital terrestrial broadcasting, the integrated services digital broadcasting-terrestrial (ISDB-T) system is adopted. However, for the signal received by the digital demodulating apparatus according to the embodiment, other than the ISDB-T system, the digital audio broadcasting (DAB) system, the digital video broadcasting-terrestrial (DVB-T) system, the digital video broadcasting-handheld (DVB-H) system, the digital multimedia broadcasting (DMB) system, or the IEEE802.11a/b/g/n system used for a wireless LAN, may be adopted.

Figure 2:
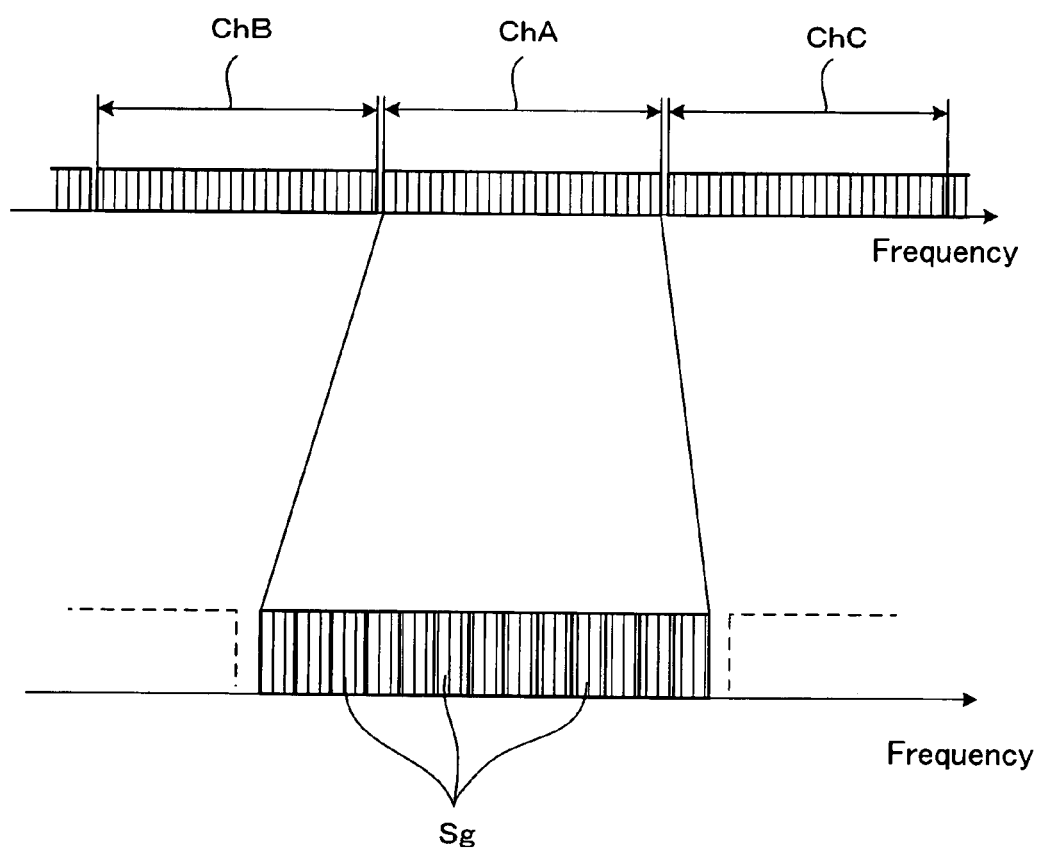
FIG. 2 is a representation of a signal to be received by the cellular phone of FIG. 1A.

FIG. 2 schematically shows a received signal for which the transmission system according to Japanese digital terrestrial broadcasting is adopted. In Japanese digital terrestrial broadcasting, an about 6 MHz-wide frequency band is allotted to each broadcaster. A number of frequency bands as described above, for example, Ch A to Ch C, neighbor each other on the axis of frequency. Each frequency band includes several thousands of carrier waves. As shown in FIG. 2, each frequency band is divided into thirteen segments Sg. One of the thirteen segments is allotted to broadcasting for mobiles such as the cellular phone 1000.

For modulating a signal according to the ISDB-T system, the orthogonal frequency division multiplexing (OFDM) method is adopted. The OFDM method is a multicarrier method in which a number of carrier waves different in frequency are used for data transmission. The carrier waves used in the OFDM method have their wave forms orthogonal to each other. Thus, several thousands of carrier waves included in each of the frequency bands Ch A to Ch C, as described above, have their wave forms orthogonal to each other.

Upon data transmission, a modulated signal is generated in which a number of carrier waves modulated in accordance with each value of data to be transmitted are superimposed. More specifically, in accordance with the order in arrangement of a number of data values contained in the data to be transmitted, the respective data values are distributed to different carrier waves. Each carrier wave is then modulated in accordance with the distributed data value, and the thus modulated carrier waves are superimposed to generate an OFDM signal. In the OFDM method, thus generating an OFDM signal is equivalent to performing inverse Fourier transform. In the below description, an effective symbol length means the inverse of a frequency separation of carrier waves used in the OFDM method.

In order to eliminate affection of delayed waves other than a direct wave, a guard interval is inserted in the modulated signal in which a number of carrier waves modulated as described above are superimposed. The guard interval is made in the manner that part of one end of a signal of each effective symbol length of the modulated signal is copied and inserted to the other end of the signal of the effective symbol length. The modulated signal into which the guard interval has been inserted, is transmitted as an OFDM signal.

The signal made up of the signal of an effective symbol length and a guard interval is referred to as one symbol. The OFDM signal is constructed as a series of a number of symbols. When a signal is received in which the OFDM signal and a delayed wave that reaches the reception side with being delayed in time, are superimposed, different symbols overlap each other in the received signal. The guard interval is used for taking out a portion in which signals contained in different symbols do not overlap, when such a delayed wave is received with being superimposed on the OFDM signal.

For example, in digital terrestrial broadcasting, coding is performed to the data to be transmitted by the OFDM signal in order to correct errors caused by noise and interference waves generated in the transmission path. For coding used are Reed-Solomon (RS) coding and Viterbi coding. In the RS coding used in digital terrestrial broadcasting, the later 16 bytes of the data of 204 bytes to be transmitted serve as check bits, and an error of eight bytes of 204 bytes can be corrected at the maximum.

In the Viterbi coding, the coding rate k/n is standardized to 1/2 to 7/8 where n represents the number of bits of encoded data to be transmitted and k represents the number of bits of data before coding. To decode the data that has been RS-encoded and Viterbi-encoded, RS decoding and Viterbi decoding are performed on the reception side.

In accordance with conditions of a transmission path, there is a case wherein burst error arises in which errors concentrate temporally or in frequency in a transmitted signal. On the other hand, when error correction was impossible after Viterbi decoding to decode a Viterbi-coded signal, in general, there are many cases wherein burst error has arisen. In the case that errors generated in a signal of a certain length as described above are to be corrected by error correction using RS decoding, there is a limit in the number of errors that can be corrected in the signal of the length. Therefore, if the burst error as described above arises, there may be a case wherein error correction is impossible.

For example, in digital terrestrial broadcasting, various kinds of interleave processing are performed to data to be transmitted by transmitted signals, in order to make error correction possible even if burst errors arise in the transmitted signals. As the interleave processing, there are known bit interleave processing, byte interleave processing, time interleave processing, and frequency interleave processing. The interleave processing as described above is to rearrange temporally or in frequency, data corresponding to signals included in a transmitted signal. In particular, time interleave processing is used for temporally rearranging a number of signals that are temporally successive. Frequency interleave processing is used for rearranging in frequency at random, a number of carrier waves that are continuous in frequency. For example, time interleave processing and time deinterleave processing for restoring time-interleaved data, are performed as follows.

Figure 3:
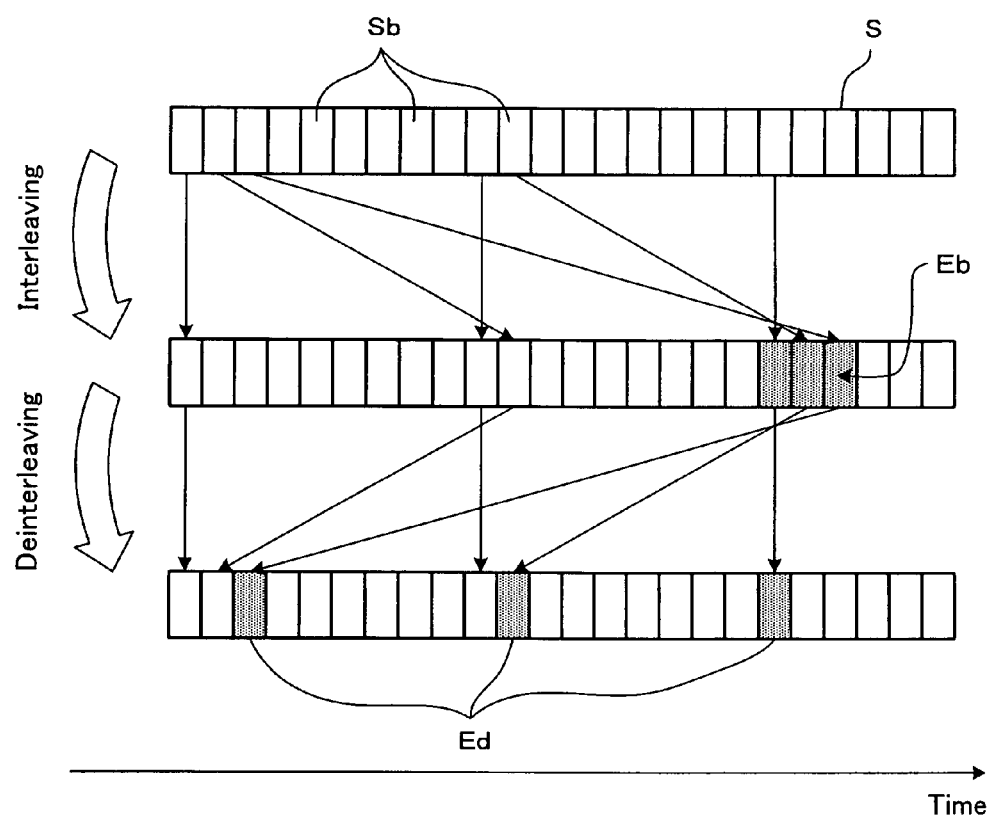
FIG. 3 is a representation showing interleave processing and deinterleave processing applied to the signal received by the cellular phone of FIG. 1A.

FIG. 3 is a representation showing an example of time interleave and deinterleave processing. FIG. 3 shows three signals before and after interleave and deinterleave processing. Each signal contains a number of symbols Sb that are temporally continuous. In addition, each signal contains a number of modulated carrier waves. That is, rearrangement in the signal as will be described below is performed over a number of carrier waves.

In a transmitter, as time interleaving, a signal S is rearranged as shown in FIG. 3 in accordance with a predetermined order. In time interleaving, rearrangement is performed such that each symbol is shifted to a position temporally later than its original position before the rearrangement. In addition, different carrier waves contained in each symbol are contained in different positions in the rearranged signal. In a receiver, as time deinterleaving, the signal S is rearranged in accordance with a predetermined order to be restored to the original arrangement, as shown in FIG. 3.

In accordance with conditions of a transmission path, a burst error Eb may arise at part of the time-interleaved signal S. However, by time deinterleaving in the receiver, the signal S is again restored to its original arrangement. Thereby, the burst error Eb having arisen over a number of symbols in the transmission path is dispersed as errors Ed in the respective symbols. Thus, even when such a burst error arises in which errors temporally concentrate, error correction is possible because the errors are dispersed after time deinterleaving.

Various kinds of interleaving other than time interleaving are applied to the signal. In byte interleaving, the signal is rearranged in a unit of byte such that data is dispersed in a unit of 204 bytes of RS coding. In bit interleaving, the signal is rearranged in a unit of bit. In frequency interleaving, symbols are rearranged over carrier waves contained in an OFDM signal. Error correction is performed after various errors generated on the transmission path are dispersed in the signal by various kinds of interleaving and deinterleaving as described above. Thus, the errors generated in the signal can surely be corrected in comparison with a case wherein no interleaving processing is applied.

In digital terrestrial broadcasting, in addition to the above, energy dispersal processing is performed to prevent energy bias in the transmitted signal due to data bias. The energy dispersal processing is performed by implementing an exclusive OR operation in a unit of bit between pseudorandom data and data according to the transmitted signal to make data random.

Figure 4:
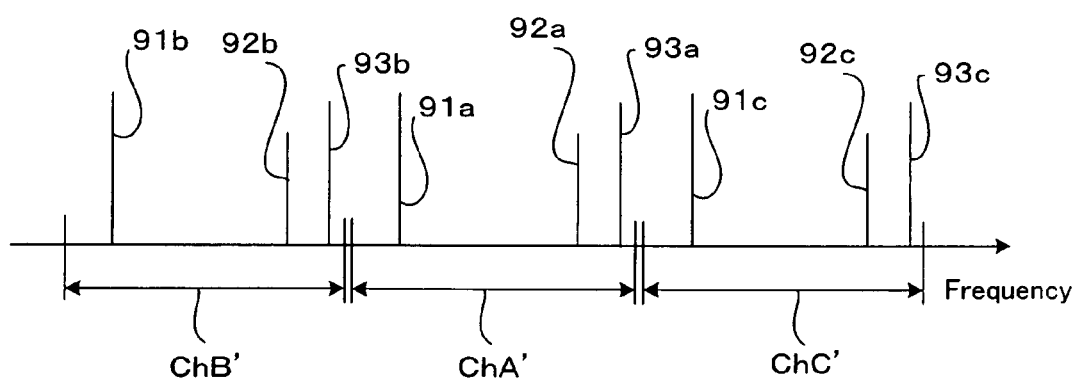
FIG. 4 is a graph showing an analogue broadcasting signal contained in the signal received by the cellular phone of FIG. 1A.

When digital broadcasting and analogue broadcasting coexist in the vicinity of the frequency band used for the digital broadcasting, the tuner 2 may receive a signal according to the analogue broadcasting. FIG. 4 is a graph showing a carrier wave distribution according to such analogue broadcasting. In FIG. 4, the axis of abscissas represents frequency and the axis of ordinate represents the intensity of signal. Ch A' to Ch C' show analogue broadcasting channels in the same frequency bands as Ch A to Ch C of FIG. 2, respectively. When each of the analogue broadcastings is according to analogue television broadcasting, for example, carrier waves 91a to 93a correspond to a picture carrier wave, a chrominance subcarrier wave, and a sound carrier wave, respectively.

Figure 5A:
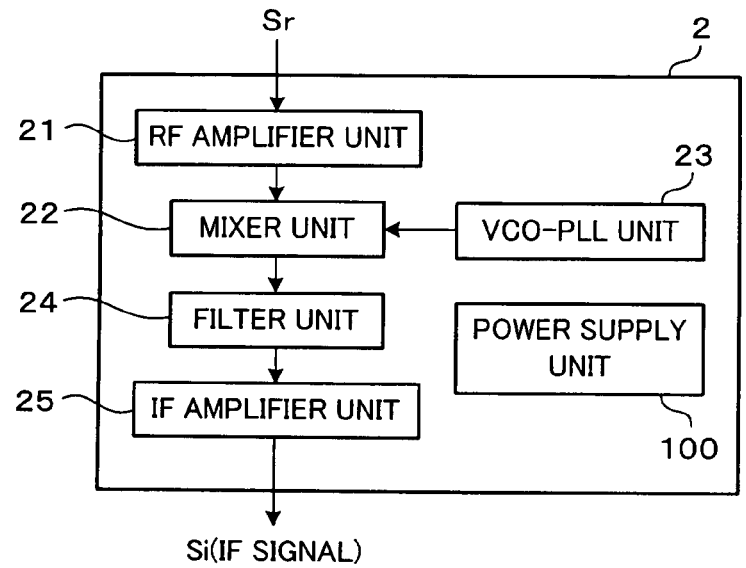
FIGS. 5A and 5B are block diagrams showing a constitution of a tuner shown in FIG. 1B.
Figure 5B:
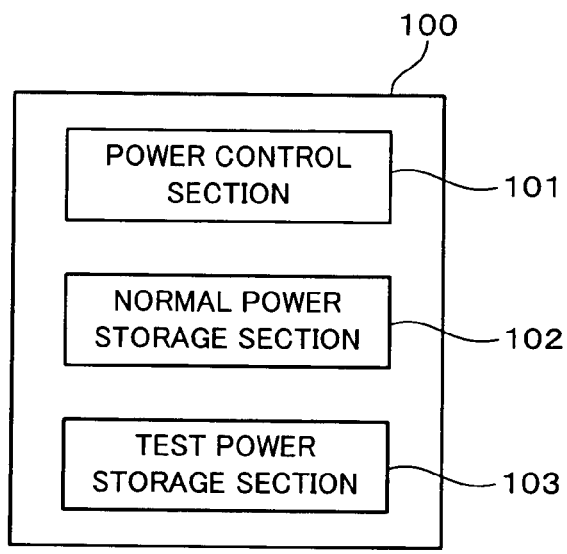

Next will be described the tuner 2. FIGS. 5A and 5B are block diagrams showing a constitution of the tuner 2.

The tuner 2 includes therein an RF amplifier unit 21, a mixer unit 22, a VCO-PLL unit 23, a filter unit 24, and an IF amplifier unit 25. The signal Sr input to the tuner 2 is amplified by the RF amplifier unit 21, and then output to the mixer unit 22. The VCO-PLL unit 23 generates a mixing signal based on a frequency corresponding to a specific channel, which is channel select processing. The mixing signal generated by the VCO-PLL unit 23 is output to the mixer unit 22. The mixer unit 22 generates an IF signal Si according to an IF frequency from the signal Sr output from the RF amplifier unit 21 and the mixing signal from the VCO-PLL unit 23.

The IF signal Si generated by the mixer unit 22 is output to the filter unit 24. The filter unit 24 includes an image removing circuit as will be described later. The filter unit 24 removes unnecessary signal components from the signal Si output from the mixer unit 22. The signal Si from which the unnecessary signal components have been removed, is output to the IF amplifier unit 25. The IF amplifier unit 25 amplifies the signal Si output from the filter unit 24, and then outputs the amplified signal Si to the demodulator 3.

The tuner 2 further includes therein a power supply unit 100. The power supply unit 100 supplies power to each of the RF amplifier unit 21, the mixer unit 22, the filter unit 24, and the IF amplifier unit 25. The RF amplifier unit 21 and so on operate by the respective powers supplied from the power supply unit 100. The power supply unit 100 includes therein a power control section 101, a normal power storage section 102, and a test power storage section 103. The normal power storage section 102 stores therein values of normal power to be supplied to the RF amplifier unit 21 and so on. The power control section 101 controls power to be supplied to each of the RF amplifier unit 21 and so on, to a value of the power being stored in one of the normal power storage section 102 and the test power storage section 103. Unless the power supply unit 100 receives a specific instruction from the controller 4, the power supply unit 100 supplies the value of the normal power being stored in the normal power storage section 102 to each circuit element such as the RF amplifier unit 21 so that the circuit element performs its normal operation. A function of a temporally power supplying unit according to the present invention corresponds to a function of the power supply unit 100 supplying a value of power being stored in the test power storage section 103 in the embodiment.

A signal output from an analogue circuit contains various kinds of noises. Therefore, when each circuit element such as the RF amplifier unit 21 is realized by an analogue circuit, a signal output from the circuit element contains noise. The intensity of the noise may depend on the power supplied to the analogue circuit. That is, the intensity of noise contained in the signal Si output from the tuner 2 may vary in accordance with the power supplied to each circuit element such as the RF amplifier unit 21. If the intensity of noise contained in the signal Si output from the tuner 2 exceeds a certain limit when the demodulator 3 demodulates the signal Si, the signal Si can not accurately be demodulated. Therefore, it is necessary to control the power supplied to each circuit element such as the RF amplifier unit 21 to be a sufficient for making it possible to accurately demodulate the signal Si.

For the above reason, in general, values of normal power stored in the normal power storage section 102 have been set so that the intensity of noise to be contained in the signal Si finally output from the tuner 2 falls within a range that makes it possible to accurately demodulate the signal Si.

Figure 6A:
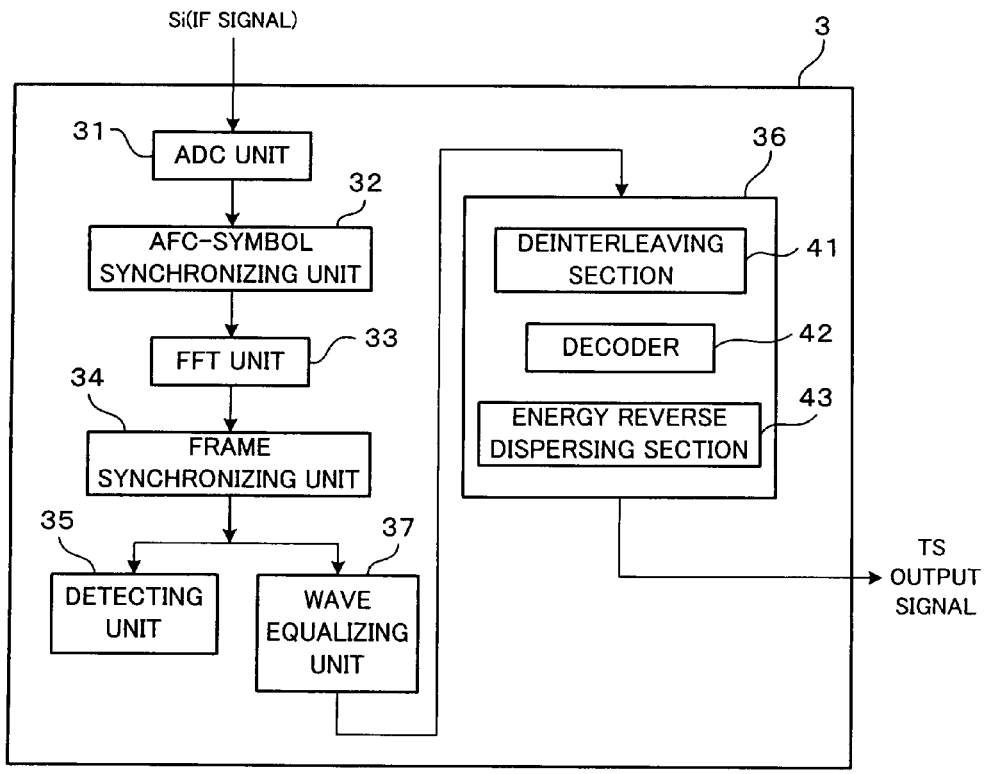
FIGS. 6A to 6C are block diagrams showing a constitution of a demodulator shown in FIG. 1B.

Next will be described the demodulator 3. FIG. 6A is a block diagram showing a constitution of the demodulator 3. As shown in FIG. 6A, the demodulator 3 is constituted by a number of circuit elements such as an ADC unit 31 as will be described below.

The demodulator 3 includes therein an ADC unit 31, an AFC-symbol synchronizing unit 32, a fast Fourier transform (FFT) unit 33, a frame synchronizing unit 34, a detecting unit 35, a wave equalizing unit 37, and an error correcting unit 36. The demodulator 3 applies demodulation processing and error correction processing to the signal Si output from the tuner 2.

The IF signal Si output from the tuner 2 is input to the ADC unit 31. The ADC unit 31 converts the input analogue signal Si into a digital signal, and outputs the converted digital signal to the AFC-symbol synchronizing unit 32.

The AFC-symbol synchronizing unit 32 applies correction processing such as filter processing to the digital signal output from the ADC unit 31. The AFC-symbol synchronizing unit 32 determines the start point of Fourier transform by the FFT unit 33 as will be described later, that is, a symbol synchronization point, and executes symbol synchronization. The AFC-symbol synchronizing unit 32 then outputs the synchronized digital signal to the FFT unit 33. At the same time, the AFC-symbol synchronizing unit 32 sends to the controller 4 information on the symbol synchronization point. Further, the AFC-symbol synchronizing unit 32 derives information on a mode indicating an effective symbol length, and sends the information to the controller 4. In this embodiment, modes indicating effective symbol lengths include a mode 1 of an effective symbol length of 252 microseconds, a mode 2 of an effective symbol length of 504 microseconds, and a mode 3 of an effective symbol length of 1008 microseconds. When the symbol synchronization point is determined, a point that makes it possible to realize the most suitable reception having the least affection of a delayed wave reaching with a delay, and so on, is set to the synchronization point. As a method of determining the synchronization point, a method in which correlation of signals is referred to; a method in which phase shift is corrected by using a pilot signal; or the like, is used.

The FFT unit 33 converts by time-frequency Fourier transform the digital signal output from the AFC-symbol synchronizing unit 32. For this Fourier transform, so-called fast Fourier transform (FFT) is used in general. Because the digital signal is an OFDM signal, it has its waveform that has been converted by inverse Fourier transform, that is, its waveform in which a number of carrier waves modulated in accordance with data values are superimposed. The FFT unit 33 takes out the carrier waves modulated in accordance with data values, from the thus superimposed wave. The FFT unit 33 then rearranges digital signals corresponding to data values distributed to the respective carrier waves, so that the signals are temporally arranged in the original order of data. The FFT unit 33 thereby reproduces a digital signal corresponding to data before generation of the OFDM signal. The FFT unit 33 then outputs the digital signal to the frame synchronizing unit 34.

The frame synchronizing unit 34 synchronizes the digital signal output from the FFT unit 33, in a unit of frame. One frame is constituted by, for example, 204 symbols, and a batch of TMCC information is obtained from one frame signal. The digital signal synchronized by the frame synchronizing unit 34 is output to the wave equalizing unit 37 and also to the detecting unit 35.

On the basis of a scattered pilot signal or the like contained in the digital signal, the wave equalizing unit 37 applies wave equalization processing to the digital signal that has been synchronized by the frame synchronizing unit 34. After correcting the signal by wave equalization, the wave equalizing unit 37 demodulates the signal into a digital signal corresponding to data values, and then outputs the demodulated digital signal to the error correcting unit 36.

In addition, the wave equalizing unit 37 performs measurement on the carrier-noise (CN) ratio. In this embodiment, when applying wave equalization to the digital signal, the wave equalizing unit 37 obtains the scattered pilot signal contained in the signal Sr output from the tuner 2. The wave equalizing unit 37 then derives the difference between the obtained scattered pilot signal and a reference value of the scattered pilot signal. On the basis of the derived difference, the wave equalizing unit 37 applies wave equalization to each carrier wave contained in the digital signal. At this time, the wave equalizing unit 37 derives the difference between the constellation of each equalized carrier wave and a reference value of the constellation, that is, a modulation error ratio (MER). In this case, because wave equalization is applied to each carrier wave, the value of MER is derived for each carrier wave. The wave equalizing unit 37 then sends to the controller 4 the value of MER derived for each carrier wave, as information on the CN ratio.

On the other hand, the detecting unit 35 takes out TMCC information contained in the digital signal. The detecting unit 35 then sends the information on TMCC to the controller 4. The TMCC information contains therein information on a transmission system such as a modulation method for carrier waves, such as 64QAM, 16QAM, or QPSK; and a convolution coding rate of, for example, 1/2, 2/3, 3/4, 5/6, or 7/8. As guard interval lengths adopted are 1/4, 1/8, 1/16, and 1/32 of the length of an effective symbol.

The error correcting unit 36 applies error correction processing to the digital signal. The error correction processing includes deinterleave processing and decode processing. As shown in FIG. 6A, the error correcting unit 36 includes therein a deinterleaving section 41, a decoder 42, and an energy reverse dispersing section 43.

Figure 6B:
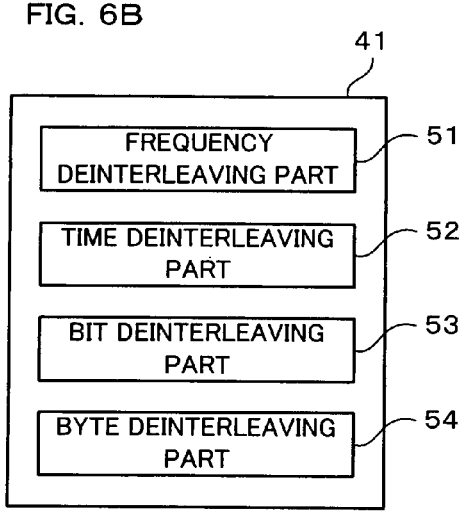

The deinterleaving section 41 applies deinterleave processing to the digital signal output from the wave equalizing unit 37. As shown in FIG. 6B, the deinterleaving section 41 includes therein a frequency deinterleaving part 51, a time deinterleaving part 52, a bit deinterleaving part 53, and a byte deinterleaving part 54. The respective deinterleaving parts 51 to 54 perform frequency deinterleaving, time deinterleaving, bit deinterleaving, and byte deinterleaving, corresponding to the respective kinds of interleaving as described above. The digital signal to which various kinds of interleaving have been performed is restored by the above kinds of deinterleaving to the digital signal before interleaving.

Figure 6C:
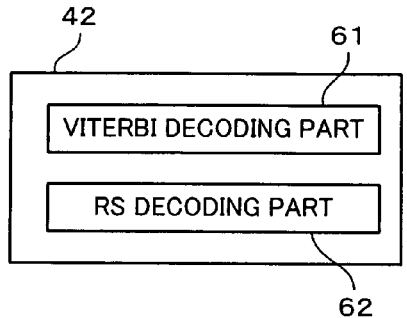

The decoder 42 applies decode processing to the digital signal output from the wave equalizing unit 37. As shown in FIG. 6C, the decoder 43 includes therein a Viterbi decoding part 61 and an RS decoding part 62. The respective decoding parts 61 and 62 perform Viterbi decoding and RS decoding as described above. Errors contained in the digital signal are corrected by the above kinds of decoding, and the digital signal that has been Viterbi-coded and RS-coded is restored by the above kinds of decoding to the digital signal before coding.

The energy reverse dispersing section 43 restores the digital signal output from the wave equalizing unit 37, to the digital signal before energy dispersal.

The above kinds of deinterleaving, decoding, and energy reverse dispersing are performed in an order corresponding to the order in which the kinds of interleaving, coding, and energy dispersing were performed on the transmission side. In the case of ISDB-T demodulation, processing is performed in the order of frequency deinterleaving, time deinterleaving, bit deinterleaving, Viterbi decoding, byte deinterleaving, energy reverse dispersing, and RS decoding.

The digital signal to which demodulate processing has been thus applied by the demodulator 3 is output from the demodulator 3 as a TS signal.

When the signal Si output from the tuner 2 contains excessively intense noise, the quantity of errors to be contained in the signal Si may be excessive. This may prevent the normal demodulation in the demodulator 3. If the demodulation is not normally performed in the demodulator 3, information on image, sound, and so on, contained in the signal received by the tuner 2, is not accurately taken out. On the other hand, as described above, noises contained in the signal Si output from the tuner 2 include noises generated in circuit elements that constitute the tuner 2. Next will be described noise to be generated in an analogue circuit constituting the tuner 2.

Noises to be generated in a signal output from an analogue circuit mainly include two kinds of noises. One is device noise generated due to thermal noise and so on in the analogue circuit. The device noise includes noise caused by heats generated from resistance elements, the base and emitter resistances of transistors, and the like, included in the analogue circuit. The device noise also includes so-called shot noise generated when charges move through an energy barrier in an analogue circuit that includes therein a positive-negative (PN) junction; and so-called flicker noise generated when charges are trapped at the boundary between an oxide and silicon of a metal-oxide-semiconductor field effect transistor (MOSFET).

The other of the noises to be generated in the signal output from the analogue circuit is interference noise generated due to an interfering wave contained in the signal Sr received by the cellular phone 1000. The interfering wave is a signal other than a target wave that corresponds to an original signal transmitted from a transmission source of the signal Sr. An output signal from an analogue circuit includes therein not only components linear to the input signal but also distortion components non-linear to the input signal. When an interfering wave other than the target wave has been mixed in the input signal, non-linear distortion components corresponding to both of the target wave and the interfering wave appear in the output signal. Of the non-linear components, the component that influences the linear components of the target wave in the output signal is called the interfering noise.

For example, it is now assumed that a frequency band corresponding to a channel to be selectively received by the tuner 2 is Ch A of FIG. 2. In this case, the interference noise is caused by any of the analog broadcasting signal of Ch A' of FIG. 4 contained in the same frequency band; the digital broadcasting signals of Ch B and Ch C contained in the respective frequency bands neighboring Ch A on the axis of frequency; and the analogue broadcasting signals of Ch B' and Ch C' of FIG. 4.

Next will be described a quantitative description of the intensity of the interference noise. When an output signal y(t) is obtained from an input signal x(t) in an analogue circuit, a relation between the signals is given by the following Expression 1. In the Expression 1, alpha$_n$ (n=0, 1, 2, . . . ) represents a coefficient of the n-order component, which indicates a characteristic of the analogue circuit. The alpha$_1$ indicates the gain of the analogue circuit. In general, alpha$_1$ is more than zero and alpha$_3$ is less than zero.

$$y(t)=\alpha_0+\alpha_1 x(t)+\alpha_2 x(t)^2+\alpha_3 x(t)^3+. \quad \text{[Expression 1]}$$

In the Expression 1, the influence of distortions other than the first- and third-order components is little in general. For simplification, the following Expression 2 approximates the relation between the input and output signals only by the first- and third-order components.

$$y(t)=\alpha_1 x(t)+\alpha_3 x(t)^3 \quad \text{[Expression 2]}$$

It is assumed that the input signal is represented by two sine waves. The amplitude and angular velocity of one sine wave are represented by A$_1$ and omega$_1$, respectively; and the amplitude and angular velocity of the other sine wave are represented by A$_2$ and omega$_2$, respectively. The following Expression 3 gives the input signal in this assumption. The relation between the angular velocity omega and the frequency f is given by omega is equal to 2 pi×f. The difference between the angular velocity and the frequency is only 2 pi. In the below description, therefore, the angular velocity and the frequency are treated as the same factor for simplification.

$$x(t)=A_1 \cos \omega_1 t + A_2 \cos \omega_2 t \quad \text{[Expression 3]}$$

By substituting the Expression 3 in the Expression 2, each frequency component in the output signal is obtained as follows. The following Expression 4 is obtained by substituting the Expression 3 in the Expression 2.

$$y(t)=\alpha_1(A_1 \cos \omega_1 t + A_2 \cos \omega_2 t)+\alpha_3(A_1 \cos \omega_1 t + A_2 \cos \omega_2 t)^3 \quad \text{[Expression 4]}$$

By expanding the Expression 4, the following Expression 5 is obtained.

$$y(t)=\alpha_1(A_1 \cos \omega_1 t + A_2 \cos \omega_2 t)+\alpha_3(A_1^3 \cos^3 \omega_1 t + 3A_1^2 A_2 \cos^2 \omega_1 t \cos \omega_2 t)+\alpha_3(3A_1 A_2^2 \cos \omega_1 t \cos^2 \omega_2 t + A_2^3 \cos^3 \omega_2 t) \quad \text{[Expression 5]}$$

Further, by expanding the Expression 5, the components whose frequencies correspond to omega$_1$ and omega$_2$ in the Expression 5 are given by the following Expression 6.

$$\omega_1, \omega_2: \left(\alpha_1 A_1 + \frac{3}{2}\alpha_3 A_1 A_2^2\right)\cos \omega_1 t + \left(\alpha_1 A_2 + \frac{3}{2}\alpha_3 A_1^2 A_2\right)\cos \omega_2 t \quad \text{[Expression 6]}$$

On the other hand, the component whose frequency corresponds to 2 omega$_1$ plus/minus omega$_2$ is given by the following Expression 7; and the component whose frequency corresponds to omega$_1$ plus/minus 2 omega$_2$ is given by the following Expression 8.

$$2\omega_1 \pm \omega_2: \left(\frac{3}{4}\alpha_3 A_1^2 A_2\right)\cos(2\omega_1 \pm \omega_2) \quad \text{[Expression 7]}$$

$$\omega_1 \pm 2\omega_2: \left(\frac{3}{4}\alpha_3 A_1 A_2^2\right)\cos(\omega_1 \pm 2\omega_2) \quad \text{[Expression 8]}$$

Figure 7A:
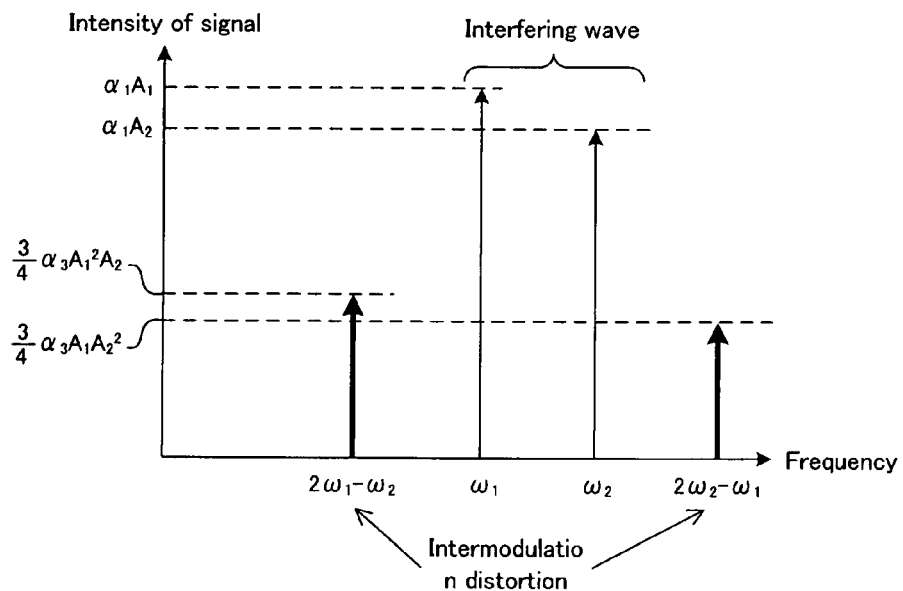
FIGS. 7A and 7B are graphs showing intermodulation distortion and cross-modulation distortion generated in a circuit element of the tuner shown in FIG. 1B.

It is now assumed that both of the sine waves whose amplitudes are represented by A$_1$ and A$_2$ are interfering waves. In this case, the spectrum of the output signal includes the components given by the Expressions 7 and 8 as the components whose frequencies correspond to 2 omega$_1$–omega$_2$ and omega$_1$–2 omega$_2$. These components are called intermodulation distortions. As apparent from the Expressions 7 and 8, the intensities of the intermodulation distortions are 3/4|alpha$_3$|A$_1^2$A$_2$ and 3/4|alpha$_3$|A$_1$A$_2^2$, respectively. FIG. 7A shows such intermodulation distortions included in the spectrum of an output signal. When the frequency of an intermodulation distortion is close to the frequency band of the target wave, the intermodulation distortion acts as noise to interfere in reception of the target wave.

Figure 7B:
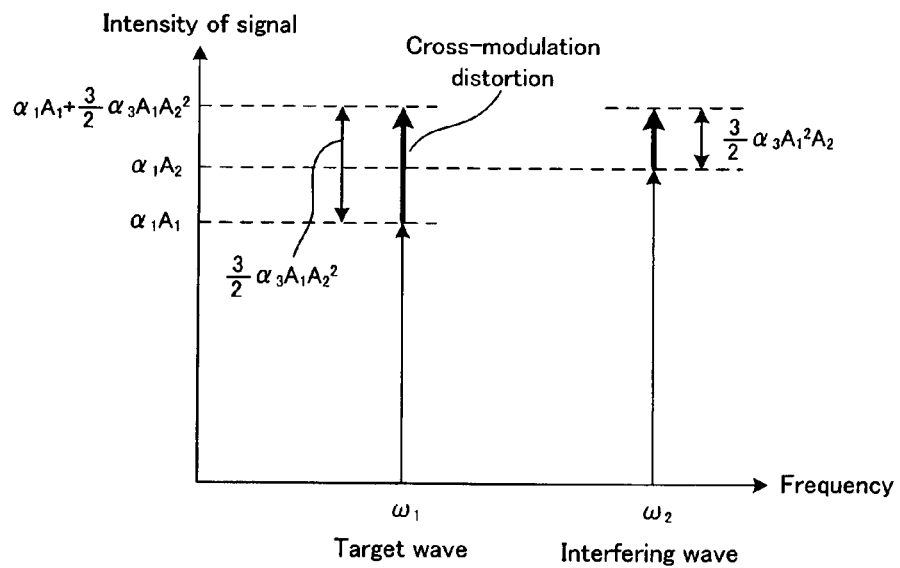

Next, it is assumed that the sine wave whose amplitude is represented by A$_1$ in the Expression 3 is the target wave and the sine wave whose amplitude is represented by A$_2$ is an interfering wave. In this case, the spectrum of the output signal includes the component given by the Expression 6 as the component whose frequency corresponds to omega$_1$, which corresponds to the frequency of the target wave itself. This component is called cross-modulation distortion. As apparent from the Expression 6, the intensity of the cross-modulation distortion is 3/2|alpha$_3$|A$_1$A$_2^2$. FIG. 7B shows such a cross-modulation distortion. When the input signal includes an interfering wave in addition to the target wave, noise due to a cross-modulation distortion is always generated as the frequency component of the target wave itself.

As described above, when the input signal contains an interfering wave in addition to the target wave, interference noise is generated in the frequency band of the target wave due to the non-linearity of the RF amplifier unit 21 and so on, constituting the tuner, and the interfering wave. As a result, the IF signal Si to be output from the tuner contains interference noise.

Figure 8A:
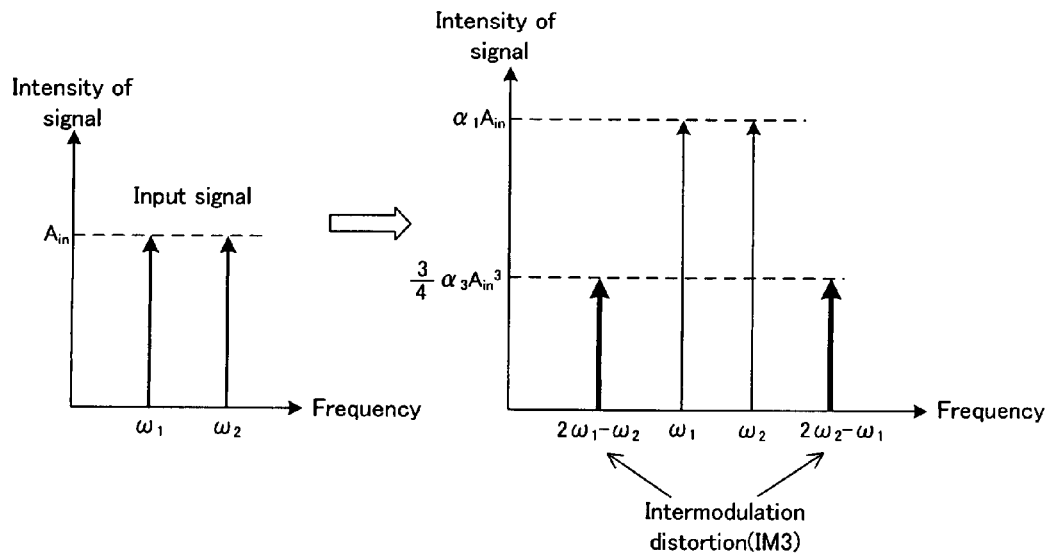
FIGS. 8A and 8B are graphs showing IIIP3 used as an index representing third-order non-linearity of a circuit element of the tuner shown in FIG. 1B.
Figure 8B:
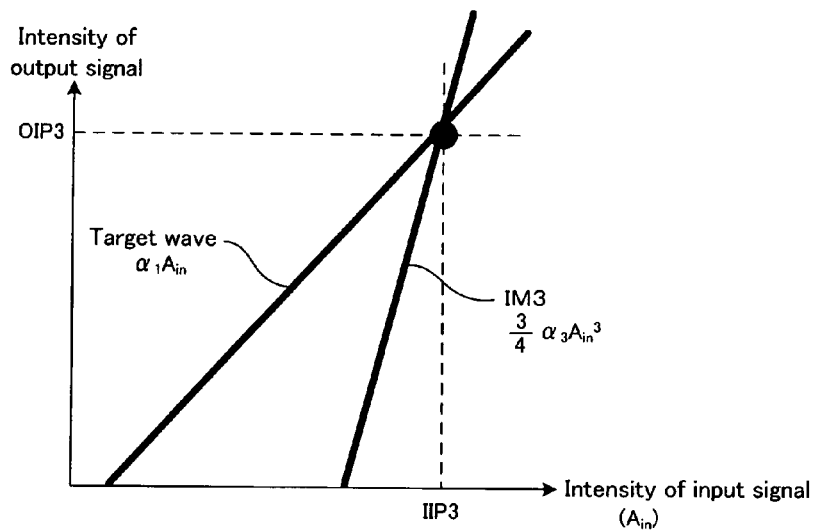

The third-order input intercept point IIP3 is generally used as an index to indicate the third-order non-linearity of a circuit element. The index IIP3 will be described below. FIGS. 8A and 8B are graphs for explaining IIP3.

As described above, when two interfering waves are input, intermodulation distortions arise. FIG. 8A shows the spectrum of an output signal of a circuit element when a signal is input that is constituted by two sine waves whose amplitudes are $A_{in}$ in common and whose frequencies correspond to omega$_1$ and omega$_2$, respectively, where omega$_1$ is not equal to omega$_2$. In the output signal, the components whose frequencies correspond to omega$_1$ and omega$_2$ are output after amplified alpha$_1$ times. These are the first-order components to the input signal. Further, non-linear third-order components in the circuit element, that is, components due to intermodulation distortions IM3, are output.

FIG. 8B is a graph showing a relation of the amplitude of the target wave to the intensity of the input signal, and a relation of the intensity of the noise due to intermodulation distortion to the intensity of the input signal. The amplitude of the target wave is proportional to the intensity of the input signal. The intermodulation distortion IM3 is proportional to the cube of the intensity of the input signal. The third-order input intercept point IIP3 and the third-order output intercept point OIP3 are defined as the intensities of the respective input and output signals at the point where the amplitude of the target wave, which is in first-order proportion to the input signal, and the intensity of the component due to the intermodulation distortion IM3, which is in third-order proportion to the input signal, intersect with each other. These are used as indexes to indicate the non-linearity peculiar to a circuit element. The amplitude of the target wave in the output signal and the intensity of the component due to the intermodulation distortion are alpha$_1 A_{in}$ and $3/4|\text{alpha}_3|A_{in}^3$, respectively. Thus, IIP3 is obtained by the following Expression 9.

$$IIP3 = \sqrt{\frac{4\alpha_1}{3|\alpha_3|}} \qquad \text{[Expression 9]}$$

Therefore, when two interfering waves either of which has its amplitude of $A_{in}$ are input, the intensity of distortion to be generated due to intermodulation is obtained by the following Expression 10 using IIP3.

$$IM3 = \alpha_1 A_{in}^3/IIP3^2 \qquad \text{[Expression 10]}$$

Further, when a target wave having its amplitude of $A_1$ and an interfering wave having its amplitude of $A_2$ are input, the intensity of distortion to be generated in the frequency of the target wave due to cross-modulation is obtained by the following Expression 11 using IIP3.

$$N = 2\alpha_1 A_1 A_2^2/IIP3^2 \qquad \text{[Expression 11]}$$

As shown by the Expression 3, the above description is about the interference noise due to intermodulation distortion generated in an analogue circuit when two sine waves are input as interfering waves. Contrastingly, noise generated due to three sine waves as in the following Expression 12 is as follows. By substituting the Expression 12 in the Expression 2 and expanding the resultant Expression, the following Expressions 13 to 15 are obtained for frequency components. The expressions 13 to 15 represent a component having frequencies of omega$_1$, omega$_2$, and omega$_3$; a component having frequencies of 2 omega$_i$ plus/minus omega$_j$, where i and j=1, 2, or 3 and i is not equal to j; and a component having a frequency of omega$_1$+omega$_2$ plus/minus omega$_3$ or omega$_1$−omega$_2$ plus/minus omega$_3$; respectively. Of the Expressions, the Expressions 14 and 15 represent the intermodulation distortion components that may be contained as interference noises in the output signal from the analogue circuit.

$$x(t) = A_1 \cos \omega_1 t + A_2 \cos \omega_2 t + A_3 \cos \omega_3 t \qquad \text{[Expression 12]}$$

$$\omega_1, \omega_2, \omega_3: \left\{ \alpha_1 A_1 + \alpha_3 \left( \begin{array}{c} A_1^3 + \frac{3}{2} A_1 A_2^2 + \\ \frac{3}{2} A_1 A_3^2 \end{array} \right) \right\} \cos \omega_1 t + \qquad \text{[Expression 13]}$$

$$\left\{ \alpha_1 A_2 + \alpha_3 \left( \begin{array}{c} A_2^3 + \frac{3}{2} A_1^2 A_2 + \\ \frac{3}{2} A_3^2 A_2 \end{array} \right) \right\} \cos \omega_2 t +$$

$$\left\{ \alpha_1 A_3 + \alpha_3 \left( \begin{array}{c} A_3^3 + \frac{3}{2} A_1^2 A_3 + \\ \frac{3}{2} A_2^2 A_3 \end{array} \right) \right\} \cos \omega_3 t$$

$$2\omega_1 \pm \omega_2: \frac{3}{4}\alpha_3 A_1^2 A_2 \cos(2\omega_1 \pm \omega_2)t \qquad \text{[Expression 14]}$$

$$2\omega_1 \pm \omega_3: \frac{3}{4}\alpha_3 A_1^2 A_3 \cos(2\omega_1 \pm \omega_3)t$$

$$2\omega_2 \pm \omega_1: \frac{3}{4}\alpha_3 A_2^2 A_1 \cos(2\omega_2 \pm \omega_1)t$$

$$2\omega_2 \pm \omega_3: \frac{3}{4}\alpha_3 A_2^2 A_3 \cos(2\omega_2 \pm \omega_3)t$$

$$2\omega_3 \pm \omega_1: \frac{3}{4}\alpha_3 A_3^2 A_1 \cos(2\omega_3 \pm \omega_1)t$$

$$2\omega_3 \pm \omega_2: \frac{3}{4}\alpha_3 A_3^2 A_2 \cos(2\omega_3 \pm \omega_2)t$$

$$\omega_1 + \omega_2 \pm \omega_3: \frac{3}{2}\alpha_3 A_1 A_2 A_3 \cos(\omega_1 + \omega_2 \pm \omega_3) \qquad \text{[Expression 15]}$$

$$\omega_1 - \omega_2 \pm \omega_3: \frac{3}{2}\alpha_3 A_1 A_2 A_3 \cos(\omega_1 - \omega_2 \pm \omega_3)$$

As will be understood by comparing the Expression 11 with the Expressions 14 and 15, the intensity and frequency of intermodulation distortion vary in accordance with what frequency and amplitude of sine wave the interfering wave causing the distortion is. That is, the distribution form of intermodulation distortions varies in accordance with how interfering waves are distributed on the axis of frequency.

In this specification, "distribution (on the axis of frequency)" or "distribution form" indicates what intensity of signal, noise, or the like, appears at each value of frequency in a graph whose axis of abscissas represents frequency and whose axis of ordinate represents the intensity of the signal, noise, or the like. That is, the "distribution" or "distribution form" corresponds to a function I(f) of the intensity I of signal or the like to the frequency f. In the function, the intensity I of signal or the like is represented by relative value. For example, I(f) is standardized so that its maximum value within the definition range is one.

As apparent from the Expressions 10, 11, and 13 to 15, the intermodulation distortion is represented by a cubic function of the intensity of interfering wave while the cross-modulation distortion is represented by a quadratic function of the intensity of interfering wave. Therefore, when the interfering wave is intense to the extent that the interference noise becomes problematic, the effect of the intermodulation distortion is larger than the effect of the cross-modulation distortion. In the below, the interference noise generated due to the intermodulation distortion is mainly considered. In a modification, however, the digital demodulating apparatus 1 may be designed so that only the effect of the intermodulation distortion is mainly considered when the intermodulation distortion is close to the frequency band of the target wave, and only the effect of the cross-modulation distortion is mainly considered when the intermodulation distortion is not close to the frequency band of the target wave.

When the channel to be selectively received by the tuner 2 is Ch A of FIG. 2, intermodulation distortions are generated due to analogue and digital broadcasting signals contained in the frequency bands neighboring Ch A. FIGS. 9A to 10B are graphs showing intermodulation distortions to be generated in the frequency band of Ch A due to such analogue and digital broadcasting signals. In FIGS. 9A to 10B, the axis of abscissas represents frequency and the axis of ordinate represents the intensity of signal or distortion.

Figure 9A:
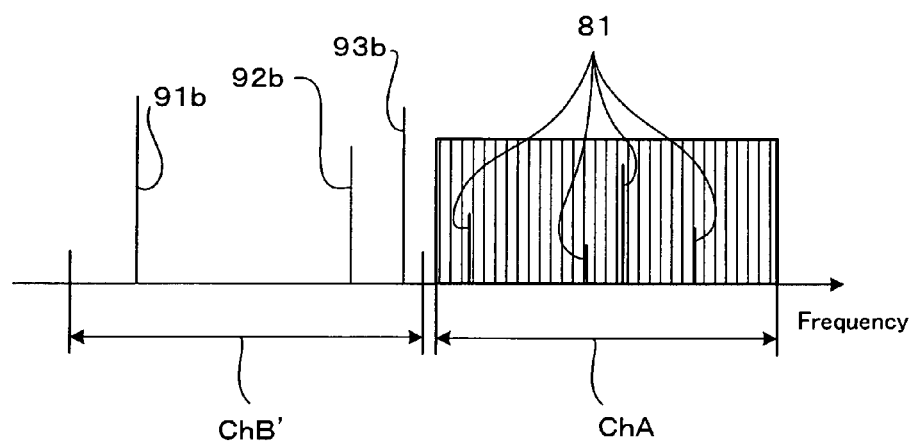
FIGS. 9A and 9B are graphs showing intermodulation distortion generated due to analogue broadcasting neighboring a channel received by the tuner shown in FIG. 1B.
Figure 9B:
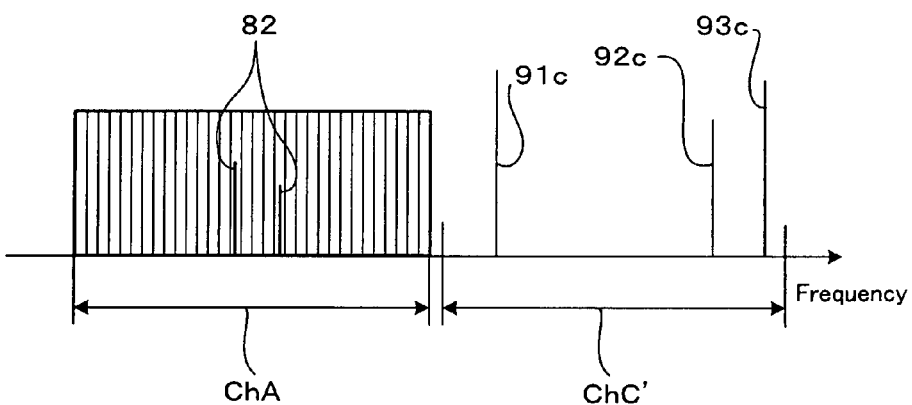

FIG. 9A shows intermodulation distortions 81 due to analogue broadcasting Ch B' shown in FIG. 2. FIG. 9B shows intermodulation distortions 82 due to analogue broadcasting Ch C' shown in FIG. 2. The intermodulation distortions 81 correspond to compositions of two or three of the carrier waves 91$b$ to 93$b$ of Ch B'. The intermodulation distortions 82 correspond to compositions of two or three of the carrier waves 91$c$ to 93$c$ of Ch C'.

Figure 10A:
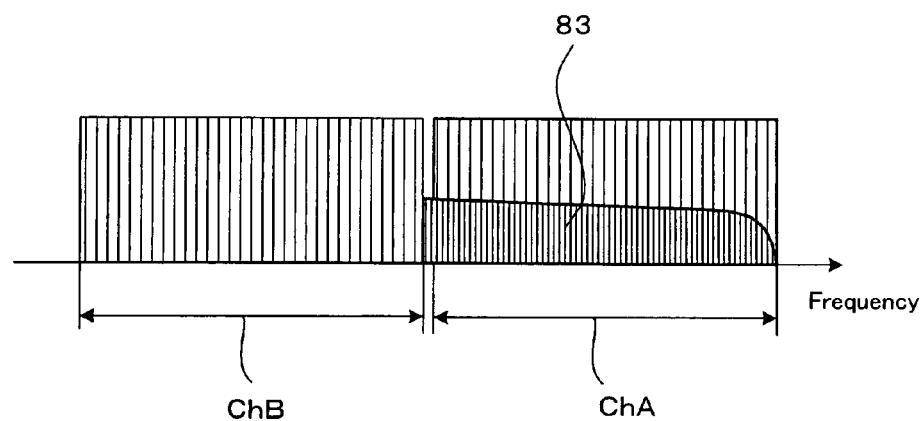
FIGS. 10A and 10B are graphs showing intermodulation distortion generated due to digital broadcasting neighboring the channel received by the tuner shown in FIG. 1B.
Figure 10B:
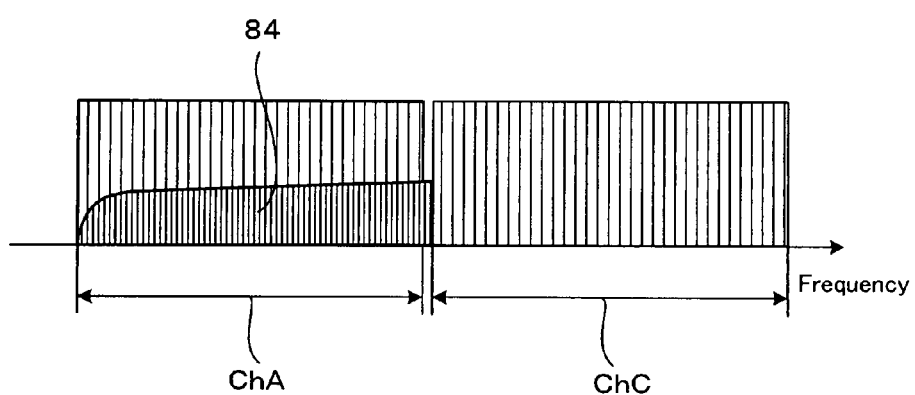

FIG. 10A shows intermodulation distortions 83 due to digital broadcasting Ch B shown in FIG. 2. FIG. 10B shows intermodulation distortions 84 due to digital broadcasting Ch C shown in FIG. 2. Digital broadcasting contains several thousands of carrier waves in the same frequency band as analogue broadcasting. Such carrier waves are continuously distributed at regular intervals in each frequency band. In the frequency band of Ch A, intermodulation distortions appear that correspond to compositions of various combinations in the large number of continuous signals contained in Ch B or Ch C. Thus, as shown in FIGS. 10A and 10B, either of the intermodulation distortions 83 and 84 appear continuously over a very wide frequency range.

As described above, the distribution of intermodulation distortions varies in accordance with whether analogue or digital broadcasting signals are contained in a frequency band neighboring the channel selectively received by the tuner 2. In addition, the distribution of intermodulation distortions also varies in accordance with signals on which side of the channel selectively received by the tuner 2 cause the distortions. Thus, the distribution form of interference noises to be generated due to intermodulation distortions varies in accordance with the distribution form of interfering waves that cause the intermodulation distortions.

As described above, an analogue circuit generates interference noise and device noise. The output signal from the analogue circuit contains, other than the noises generated in the analogue circuit itself, noises originally contained in the input signal to the analogue circuit. For example, the input signal to the IF amplifier unit 25 contains noises generated in the RF amplifier unit 21, the mixer unit 22, and the filter unit 24, and further noises in the signal input to the tuner 2.

Thus, the output signal from an analogue circuit contains: (1) interference noise generated in the analogue circuit; (2) device noise generated in the analogue circuit; (3) noises generated in another analogue circuit; and (4) noises generated before input to the tuner. The noises of (3) generated in another analogue circuit are constituted by interference noise and device noise generated in the other analogue circuit. When each analogue circuit amplifies its input signal, the noises contained in the input signal are also amplified. Therefore, the noises of (3) and (4) are output after amplified.

On the other hand, as will be described below, the intensity of noise to be contained in the output signal from an analogue circuit may vary in accordance with the power supplied to the analogue circuit.

Figure 11A:
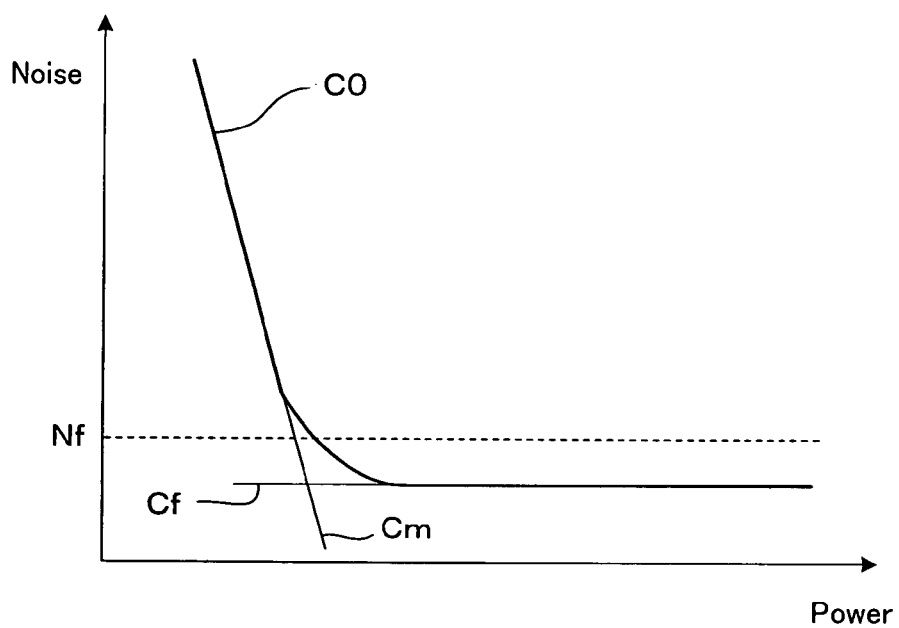
FIG. 11A is a graph showing a relation between the intensity of noise to be contained in an output signal from a circuit element of the tuner shown in FIG. 1B and the power to be supplied to the circuit element.
Figure 11B:
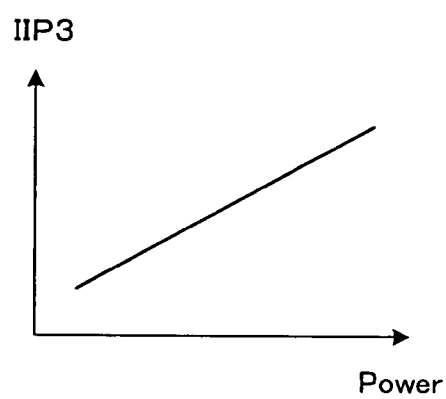
FIG. 11B is a graph showing a relation between IIP3 of the circuit element and the power to be supplied to the circuit element.

FIG. 11A is a graph generally showing an example of a relation between the intensity of noise contained in the output signal from one analogue circuit of the RF amplifier unit 21, the mixer unit 22, the filter unit 24, and the IF amplifier unit 25, and the power to be supplied to the analogue circuit. In the graph of FIG. 11A, the axis of abscissas represents the value of the power to supply; and the axis of ordinate represents the intensity of noise. FIG. 11B is a graph generally showing a relation between the intensity of the power to be supplied to the analogue circuit and IIP3 of the analogue circuit. In either of the graphs of FIGS. 11A and 11B, a logarithmic scale is used on the axis of ordinate.

In FIG. 11A, a curved line Cf represents an example in which no interference noise exists, and a curved line Cm represents an example in which only interference noise exists. As apparent from the Expressions 10 and 11, the interference noise is inversely proportional to the square of IIP3. In addition, as apparent from FIG. 11B, IIP3 exponentially increases as the supplied power increases. Therefore, as apparent from the curved line Cm, the intensity of the interference noise sharply increases as the power decreases.

On the other hand, a change in the noise other than the interference noise to a change in the power is very little in comparison with a change in the interference noise to a change in the power. In this specification, therefore, as shown by the curved line Cf, the intensity of the noise other than the interference noise is considered to be substantially constant to the change in the power. The noise other than the interference noise, shown by the curved line Cf, includes (2) device noise generated in the analogue circuit, (3) noises generated in another analogue circuit, and (4) noises generated before input to the tuner, of the above-described noises of (1) to (4).

A curved line C0 represents a relation of the aggregate noise of the interference noise and the device noise to the power. Because the curved lines Cm and Cf have the above-described characteristics, the intensity of the noise shown by the curved line C0 is substantially constant in a high-power region. Contrastingly, on the curved line C1, the noise sharply increases as the power decreases less than a certain value. Each circuit element constituting the tuner 2 has a circuit characteristic as shown by the curved line C0. Therefore, if the supplied power is excessively low and the intensity of noise exceeds a certain noise reference value Nf, signal reception may be affected, for example, sufficient demodulation can not be performed in the demodulator 3. For this reason, the power to supply must sufficiently be ensured so that the intensity of noise does not exceeds the reference value Nf.

In this embodiment, the reference value Nf indicates the upper limit of the intensity of noise that makes error correction by the error correcting unit 36 successful. The successful error correction by the error correcting unit 36 means that the bit rate or the like of errors contained in the signal after error correction by the error correcting unit 36 is less than a predetermined value. For example, when the bit error rate after RS decoding is not more than $1 \times 10^{-11}$, it means that the error correcting unit 36 successfully performed error correction.

On the other hand, as shown in FIGS. 2 and 4, the distribution form of signals contained in a frequency band neighboring the channel selectively received by the tuner 2 varies in accordance with whether the signals are according to analogue or digital broadcasting. Therefore, as shown in FIGS. 9A to 10B, the distribution form of intermodulation distortions that appear in the frequency band corresponding to the received channel, varies accordingly. In addition, the distribution form of intermodulation distortions also varies in accordance with on which side of the received channel the broadcasting neighbors the received channel. Broadcasting received by the cellular phone 1000 corresponds to one of, for example, thirteen segments contained in one frequency band. Because whether or not intermodulation distortions appear in the frequency band corresponding to the one segment, depends on the distribution form of the intermodulation distortions, this causes difference in the relation between the supplied power and noise.

Figure 12A:
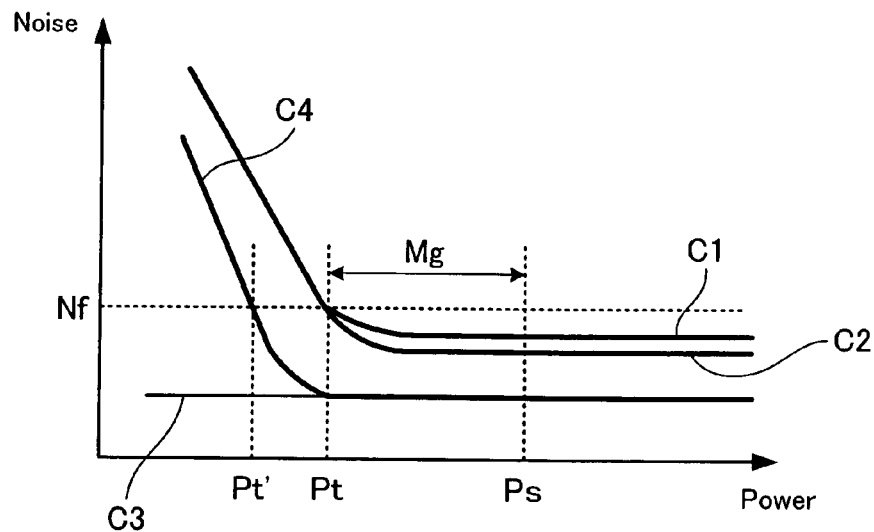
FIGS. 12A and 12B are graphs showing relations between the intensity of noise and the power to be supplied to the circuit element shown in FIG. 11A, in accordance with the difference between broadcastings neighboring a received channel on both sides of the channel.
Figure 12B:
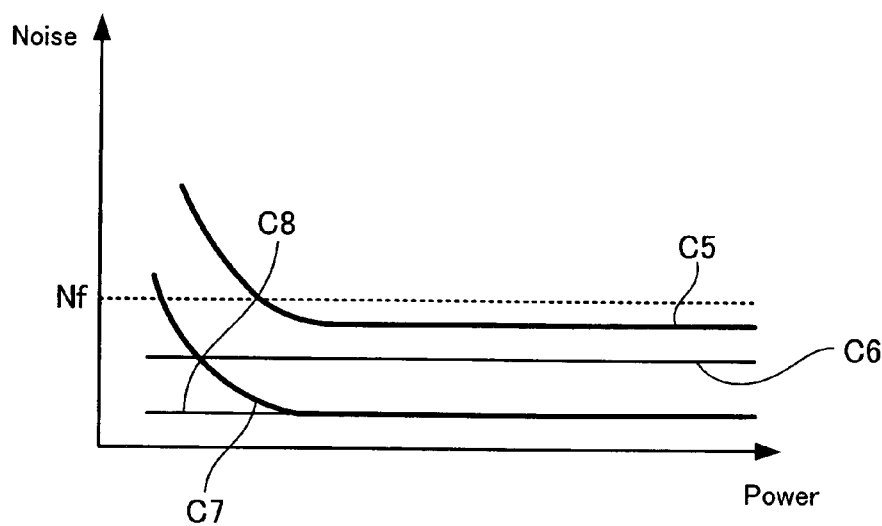

Each of FIGS. 12A and 12B shows, by way of example, a change in noise to power supplied to an analogue circuit in a so-called 1-segment tuner according to the ISDB-T system using the Low-IF method. FIG. 12A shows a relation between the power supplied to a mixer circuit and noise to be contained in a signal output from the mixer circuit. FIG. 12B shows a relation between the power supplied to an IF filter circuit and noise to be contained in a signal output from the IF filter circuit. In FIGS. 12A and 12B, each of curved lines C1 to C8 represents a relation between power to supply and noise. Of the curved lines, curved lines C1 and C5 represent the relations when a digital broadcasting wave is contained in one of the frequency bands neighboring the received channel on both sides of the received channel, which is higher in frequency than the received channel. Contrastingly, curved lines C2 and C6 represent the relations when a digital broadcasting wave is contained in one of the frequency bands neighboring the received channel on both sides of the received channel, which is lower in frequency than the received channel. Hereinafter, the frequency bands neighboring the received channel on the higher- and lower-frequency sides of the received channel will be referred to as upper and lower neighboring channels, respectively. Curved lines C3 and C7 represent the relations when an analogue broadcasting wave is contained in the upper neighboring channel. Contrastingly, curved lines C4 and C8 represent the relations when an analogue broadcasting wave is contained in the lower neighboring channel. In any of the curved lines C1 to C8, the power of the interference wave is substantially the same.

As shown in FIGS. 12A and 12B, the relation between power to supply and noise varies in accordance with whether a digital or analogue broadcasting wave exists in a neighboring channel, and whether such a broadcasting wave is in the upper or lower neighboring channel. Next will be generally described why the characteristics of noise to supplied power in the mixer and IF filter circuits are as shown in FIGS. 12A and 12B.

First, as apparent from both of FIGS. 12A and 12B, the noise when the interference wave is a digital broadcasting wave is more intense as a whole than that when the interference wave is an analogue broadcasting wave. The reason is as follows. As shown in FIGS. 9A and 9B, when the interference wave is an analogue broadcasting wave, distortions due to the interference wave locally appear in the received channel. Contrastingly, as shown in FIGS. 10A and 10B, when the interference wave is a digital broadcasting wave, distortions appear in a band broader than that in the case of the analogue broadcasting wave. In addition, the whole power of distortions including intermodulation distortions is higher in the case of the digital broadcasting wave.

Secondly, on the curved lines C1 and C2, when the supplied power is low, that is, when the supplied power to the mixer circuit decreases and the distortion characteristic has become bad, the powers of distortions generated due to the interference waves are substantially the same. More specifically, in the case that the interference wave is a digital broadcasting wave, even when the interference wave exists in either of the upper and lower neighboring channels, the power of distortions when the supplied power is low is substantially the same. On the other hand, as apparent from the curved lines C3 and C4, in the case that the interference wave is an analogue broadcasting wave, the noise when the analogue broadcasting wave exists in the lower neighboring channel is more intense in a range in which the supplied power to the mixer circuit, than the noise when the analogue broadcasting wave exists in the upper neighboring channel. This is because frequencies on which intermodulation distortions appear due to the analogue broadcasting wave, vary in accordance with whether the analogue broadcasting wave exists in the upper or lower neighboring channel. For example, when the carrier waves 91b to 93b exist in the lower neighboring channel as shown in FIG. 9A, intermodulation distortions due to the carrier waves appear in the target segment. Contrastingly, when the carrier waves 91c to 93c exist in the upper neighboring channel as shown in FIG. 9B, intermodulation distortions due to the carrier waves appear in another segment than the target segment. Thus, how distortion components appear in the target segment, depends on the relation in frequency between the carrier waves contained in the analogue broadcasting wave. For example, it depends on the relation in position on the axis of frequency between the picture carrier wave, the sound carrier wave, and the chrominance subcarrier wave of the analogue broadcasting wave, as shown in FIGS. 9A and 9B.

Third, as apparent from the curved lines C5 and C6, in the IF filter circuit, the intensity of noise in a range in which the supplied power is low, varies in accordance with whether a digital broadcasting wave as an interfering wave exists in the upper or lower neighboring channel. The reason is as follows. In the Low-IF type tuner, when the center frequency, the IF frequency, and the local frequency of the target segment are represented by $F_0$, $F_{IF}$, and $F_{LO}=F_0-F_{IF}$, respectively, frequency conversion is applied to a signal so that the center frequency of the target segment is changed from $F_0$ into $F_{IF}$.

Figure 13A:
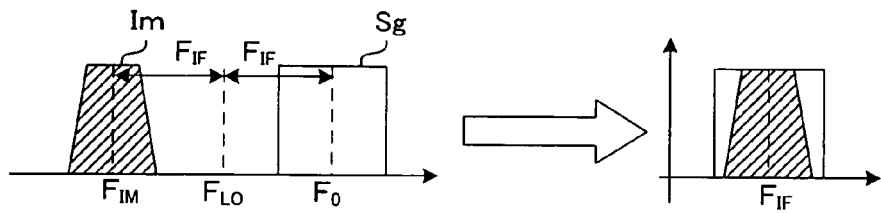
FIGS. 13A to 13C are graphs for explaining evidence of obtaining the relations between the intensity of noise and the power to be supplied to the circuit element as shown in FIGS. 12A and 12B.
Figure 13B:
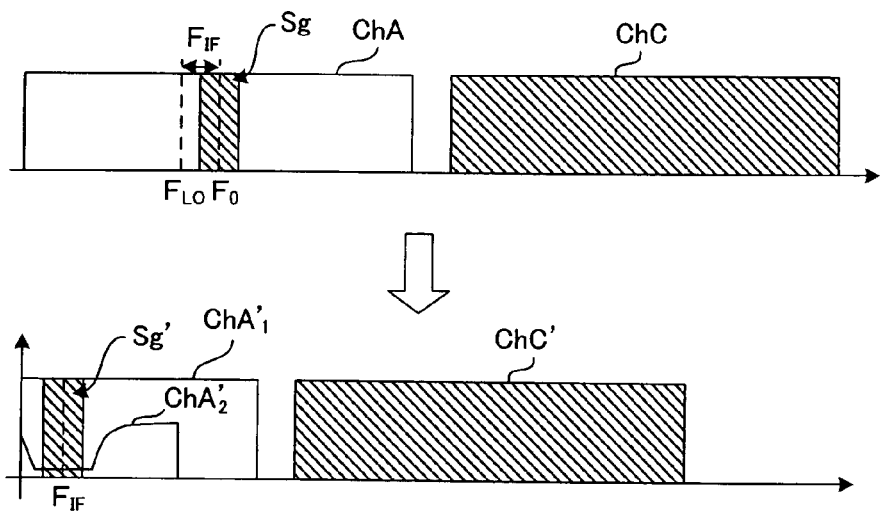
Figure 13C:
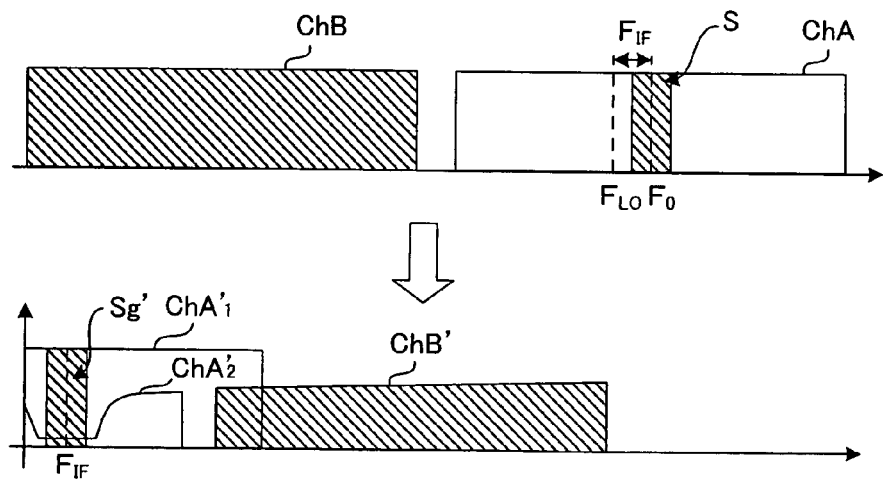

FIG. 13A shows signals before and after the frequency conversion. In FIGS. 13A to 13C, the axis of abscissas represents frequency and the axis of ordinate represents the intensity of signal. In FIG. 13A, the left graph shows a signal before the frequency conversion, and the right graph shows the signal after the frequency conversion. As shown in FIG. 13A, the frequency conversion is performed so that the center frequency of the target segment Sg is changed into $F_{IF}$ after the conversion. When the frequency conversion is performed, signal components contained in the frequencies f less than $F_{LO}$ before the conversion, overlap the components of $(F_{LO}-f)$ after the conversion. Therefore, when the frequency conversion is performed, a problem arises that signals in a band near an image frequency $F_{IM}=F_{LO}-F_{IF}$, overlap signals contained in the band of the target segment, as shown in FIG. 13A. In order to avoid the problem, in general, the Low-IF type tuner includes therein an image removing circuit for removing images. In this embodiment, as described before, such an image removing circuit is provided in the filter unit 24 of FIG. 5A. That is, after the frequency conversion is performed in the mixer unit 22, the signal having been converted in frequency is input to the image removing circuit on the subsequent stage to remove images from the signal.

FIGS. 13B and 13C are graphs showing the spectrum of a signal before image removal by the image removing circuit, and the spectrum of the signal to which both of the frequency conversion and the image removal have been applied. In either of FIGS. 13B and 13C, the upper graph shows the spectrum before the frequency conversion, and the lower graph shows the spectrum after the frequency conversion.

FIG. 13B shows a case wherein the upper neighboring channel Ch C of the received channel Ch A contains a digital broadcasting wave as an interfering wave. FIG. 13C shows a case wherein the lower neighboring channel Ch B of the received channel Ch A contains a digital broadcasting wave as an interfering wave. The received channel Ch A contains the target segment Sg.

In FIGS. 13B and 13C, Sg' represents a signal obtained by applying the frequency conversion and the image removal to a signal contained in the target segment Sg. Ch $A'_1$ and Ch $A'_2$ may represent signals obtained by applying the frequency conversion and the image removal to signals contained in the received channel Ch A. Of them, Ch $A'_1$ represents signals obtained by applying the conversion to frequency components more than $F_{LO}$ in Ch A before conversion. Ch $A'_2$ represents signals obtained by applying the conversion to frequency components less than $F_{LO}$ in Ch A before conversion. Although the image removing circuit is for removing a signal symmetrical to a target segment signal Sg with respect to the frequency $F_{LO}$, the circuit has a characteristic of decreasing the power of a signal distant from the position symmetrical to the target segment signal Sg with respect to the frequency $F_{LO}$, in a frequency range less than $F_{LO}$. Thus, in Ch $A'_2$, frequency components around the target segment Sg' are largely removed, and frequency components distant from the target segment Sg' are partially removed.

Contrastingly, frequency components more than $F_{LO}$ are not removed by the image removal. Therefore, as shown in FIG. 13B, when $F_{LO}$ is less than the frequency of the target segment Sg, the level of the interfering wave contained in the upper neighboring channel Ch C may not change before and after the image removal. On the other hand, as shown in FIG. 13B, because the interfering wave contained in the lower neighboring channel Ch B is in a range less than $F_{LO}$, the power tends to decrease due to the characteristic of the image removing circuit.

As described above, when the image removal is performed by the image removing circuit, the level of the interfering wave contained in the lower neighboring channel decreases. On the other hand, the level of the interfering wave contained in the upper neighboring channel is hard to decrease. Therefore, a change in noise to supplied power in the IF filter circuit on a stage subsequent to the image removing circuit may be as shown in FIG. 12B. That is, when the lower neighboring channel contains an interfering wave, the level of distortion generated due to the interfering wave may be low in comparison with a case wherein the upper neighboring channel contains an interfering wave. This feature is common to both cases wherein the interfering wave is a digital broadcasting wave and wherein the interfering wave is an analogue broadcasting wave. On the other hand, in the case of controlling the power of the mixer circuit on a preceding stage of the image removing circuit, a change in noise as shown in FIG. 12B may be obtained when the power to the mixer circuit is sufficiently high and the distortion characteristic of the mixer circuit is good. That is, because of the influence of the image removing circuit, the level of distortion in the case wherein the lower neighboring channel contains an interfering wave may be low in comparison with a case wherein the upper neighboring channel contains an interfering wave.

Which of analogue and digital broadcasting exists in a frequency band neighboring the received channel, and on which side of the received channel the broadcasting exists, depend on the positional relation between the cellular phone 1000 and a transmitter station of the broadcasting, conditions surrounding the cellular phone 1000, and so on. Therefore, it is necessary to set the power supplied to each analogue circuit to a value having a sufficient margin in order that the demodulator 3 can demodulate the signal Si irrespective of the distribution form of interfering waves such as analogue broadcasting waves contained in a frequency band neighboring the received channel.

For example, the power to supply must have been controlled to a value that enables sufficient demodulation even when any of the interfering noises shown in FIGS. 9A to 10B appears. In addition, there are manufacturing variations in each circuit element. Further, an accidental variation may arise in the power supplied to a circuit element in accordance with operation conditions of the tuner 2, or a variation may arise in the circuit characteristics of each circuit element in accordance with the operation environment such as the atmospheric temperature. In consideration of such manufacturing variations, variation in the supplied power, change in the operation temperature, and so on, the power to supply must have been controlled to a sufficiently high value.

More specifically, as shown in FIG. 12A, in the initial state of the cellular phone 1000, the value of the normal power being stored in the normal power storage section 102 is set to Ps higher than a certain value Pt by a margin Mg. In this embodiment, Pt is the lower limit of a range in which noise is not more than the reference value Nf, on the curved line C1. That is, for each analogue circuit such as the RF amplifier unit 21, the normal power storage section 102 stores therein a value having a sufficient margin Mg in order that the demodulator 3 can accurately demodulate the signal Si even when the distribution form of interfering waves has changed or the operation environment has changed. Thus, for example, even when the distribution form of interfering waves has changed, each circuit element such as the RF amplifier unit 21 can be supplied with a sufficient power that enables successful demodulation.

On the other hand, if the power to supply is always kept at Ps, it is undesirable because the power consumption is excessively high. For example, when the noise changes as shown by the curved line C4, the lower limit of the power range in which the noise is less than the reference value Nf, is Pt'. The difference between Ps and Pt' is larger than the difference between Ps and Pt. Therefore, in the case that the noise changes as shown by the curved line C4, the power to supply may be set to a value lower than Ps. Further, in the case that a change in noise is little as shown by the curved line C3, there is no problem even when the power to supply is considerably reduced.

Figure 14A:
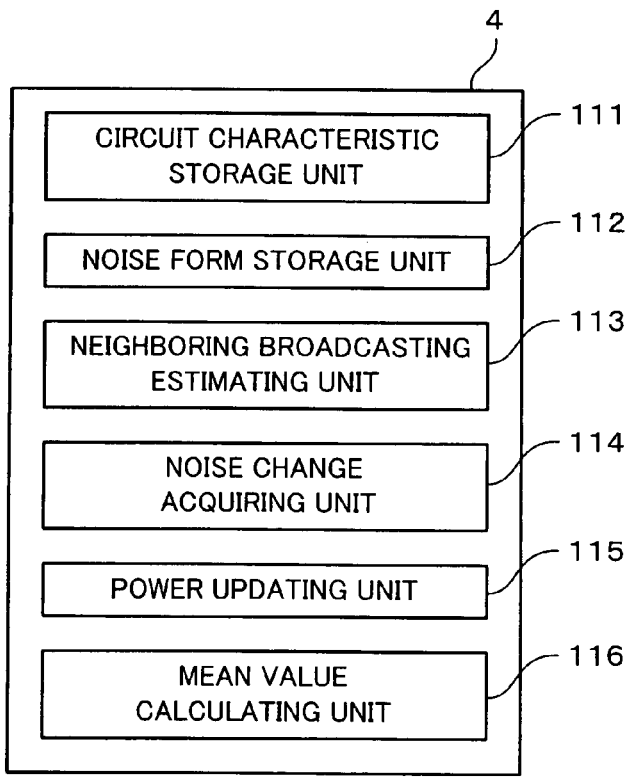
FIGS. 14A and 14B are block diagrams showing a constitution of a controller shown in FIG. 1B.
Figure 14B:
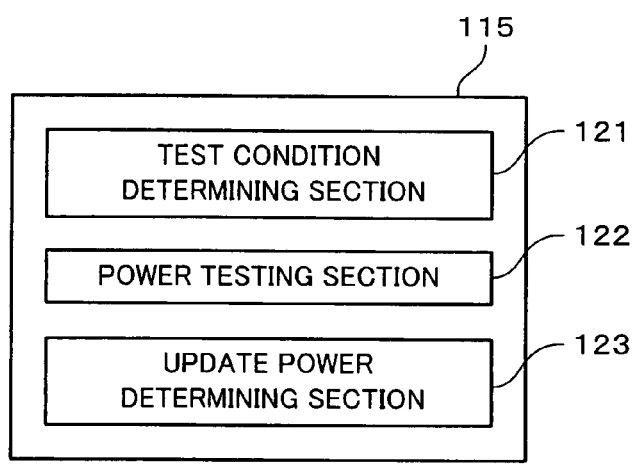

Next will be described the controller 4 that controls the power to supply. In the below, a case will be mainly described wherein the power is controlled that is to be supplied to a circuit element such as the mixer circuit on a preceding stage of the image removing circuit. Therefore, the circuit element whose supplied power is to be controlled will be described on the assumption that it has the circuit characteristic as shown by the curved lines C1 to C4 of FIG. 12A. On the other hand, when the power is controlled that is to be supplied to a circuit element such as the IF filter circuit on a subsequent stage of the image removing circuit, the same constitution as the controller as will be described below may be adopted but on the assumption that the circuit element has the circuit characteristic as shown by the curved lines C5 to C8 of FIG. 12B. FIGS. 14A and 14B are block diagrams showing a constitution of the controller 4. As shown in FIG. 14A, the controller 4 includes therein a circuit characteristic storage unit 111, a noise form storage unit 112, a neighboring broadcasting estimating unit 113, a noise change acquiring unit 114, a power updating unit 115, and a mean value calculating unit 116.

The circuit characteristic storage unit 111 stores therein information on a circuit characteristic of each circuit element such as the RF amplifier unit 21 included in the tuner 2. The information on the circuit characteristic includes information that indicates alpha1 and alpha3 in relation to the linearity/ non-linearity of the circuit element as shown by the Expression 2. In a modification, the circuit characteristic storage unit 111 may store therein information on IIP3 so that alpha1 and alpha3 can be estimated from the information on IIP3.

The noise form storage unit 112 stores therein information on the distribution form of CN ratios to be measured in the frequency band of the received channel when a frequency band neighboring the received channel contains signals of analogue or digital broadcasting. In addition, the noise form storage unit 112 stores therein information that indicates the relation between power to supply and noise as shown by each of the curved lines C1 to C4 of FIG. 12A, with being related to information that indicates which of analogue broadcasting and digital broadcasting the stored information corresponds to, and information that indicates on which side of the received channel the frequency band neighbors the received channel. In the latter case, the noise form storage unit 112 serves as a relation storage unit.

The mean value calculating unit 116 calculates a mean value of CN ratios in a predetermined period, on the basis of information on CN ratio transmitted from the demodulator 3. In a period other than the period in which a power testing section 122, which will be described later, performs an update value test, the mean value calculating unit 116 calculates a mean value of CN ratios when a normal power is supplied to each circuit element, which mean value will hereinafter be referred to as normal CN ratio. The period in which the mean value is calculated may be set in advance, or may be the period from the end of an update value test to the start of the next update value test. Otherwise, the period in which the mean value is calculated may be the period from reception of an instruction to start the calculation to reception of an instruction to stop the calculation at some timing.

The neighboring broadcasting estimating unit 113, as a distribution estimating unit, estimates a distribution form of signals contained in a frequency band neighboring the received channel. More specifically, on the basis of information on the CN ratio of each carrier wave transmitted from the demodulator 3, the neighboring broadcasting estimating unit 113 estimates in what form the signals contained in the frequency band neighboring the received channel are distributed. As described above, in this embodiment, the object actually measured by the demodulator 3 is a MER, and the demodulator 3 transmits to the controller 4 the MER as the information on CN ratio. The neighboring broadcasting estimating unit 113 actually treats values of MER as CN ratios.

Intermodulation distortions as shown in FIGS. 9A to 10B are generated due to signals of analogue and digital broadcastings. Therefore, at a position where an intermodulation distortion appears, the CN ratio measured in the frequency band of the received channel decreases in accordance with the intensity of the intermodulation distortion. Thus, the CN ratios measured in the frequency band of the received channel are distributed as shown in FIGS. 15A to 15D. FIGS. 15A to 15D correspond to cases wherein the frequency bands neighboring the received channel contain the signals as shown in FIGS. 9A to 10B, respectively.

The noise form storage unit 112 stores therein information indicating the CN ratio distribution forms as shown in FIGS. 15A to 15D, with being related to both of the information indicating whether digital or analogue broadcasting causes the interference, and the information indicating on which side of the received channel the frequency band containing the interference neighbors the received channel. On the basis of information from the demodulator 3, the neighboring broadcasting estimating unit 113 compares the CN ratio distribution form actually measured in the frequency band of the received channel, with the CN ratio distribution forms stored in the noise form storage unit 112. Thereby, the neighboring broadcasting estimating unit 113 estimates whether the interfering waves causing the actually measured CN ratios are caused by analogue or digital broadcasting, and on which side of the received channel the frequency band containing the interfering waves neighbors the received channel. In this case, the neighboring broadcasting estimating unit 113 serves as an interference judging unit.

Figure 15A:
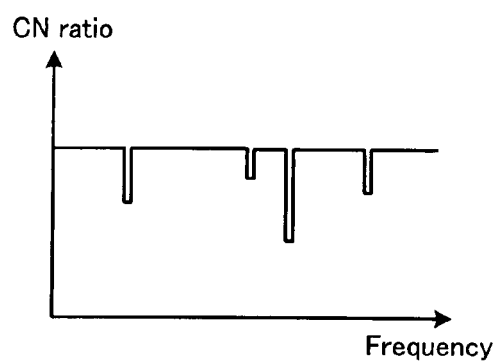
FIGS. 15A to 15D are graphs showing CN ratios measured by the demodulator, in accordance with the intermodulation distortions shown in FIGS. 9A to 10B.
Figure 15B:
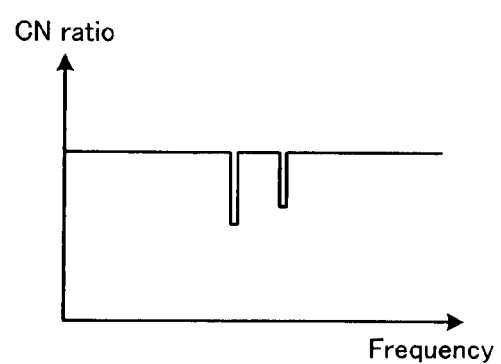
Figure 15C:
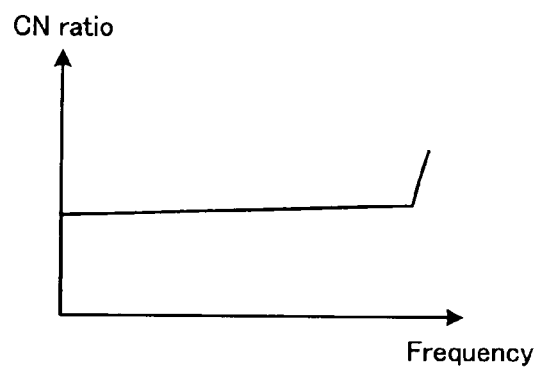
Figure 15D:
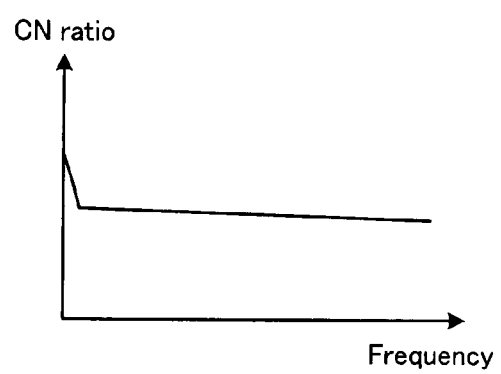

For example, when the actually measured CN ratios are close to the distribution form of FIG. 15A, the neighboring broadcasting estimating unit 113 decides that the interference waves are caused by analogue broadcasting contained in the frequency band neighboring the received channel on the lower frequency side of the received channel. On the other hand, when the actually measured CN ratios are close to the distribution form of FIG. 15D, the neighboring broadcasting estimating unit 113 decides that the interference waves are caused by digital broadcasting contained in the frequency band neighboring the received channel on the higher frequency side of the received channel.

On the basis of the kind of the interfering waves and on which side of the received channel the frequency band containing the interfering waves neighbors the received channel, decided by the neighboring broadcasting estimating unit 113, the noise change acquiring unit 114 acquires information, being stored in the noise form storage section 112, to indicate a relation between the supplied power and noise. More specifically, the noise change acquiring unit 114 acquires information on one of the curved lines C1 to C4 shown in FIG. 12A, which represents a change in noise to supplied power in accordance with the distribution form of the interfering waves, that is, signals according to digital or analogue broadcasting, contained in the frequency band neighboring the received channel.

In addition, the noise change acquiring unit 114 acquires the levels of the interfering waves contained in the signal received by the tuner 2, from the differences between the actually measured values of CN ratios at different frequencies. For example, in FIGS. 15A and 15B, the frequencies at which the CN ratio has decreased correspond to frequencies where interference noise has appeared, and the other frequencies correspond to frequencies where no interference noise has appeared. Therefore, the absolute intensity of each interference noise can be estimated from the difference between the actually measured value of CN ratio at the frequency where the interference noise has appeared, and the actually measured value of CN ratio at a frequency where no interference noise has appeared. The same applies to FIGS. 15C and 15D. For example, in FIG. 15C, the frequency at the right end of the graph corresponds to the frequency where no influence of interference noise has appeared. Therefore, the absolute intensity of the interference noise can be estimated from the difference between the actually measured value of CN ratio at the frequency at the right end of the graph, and the actually measured value of CN ratio at another frequency where no influence of interference noise has appeared.

On the basis of the relation between power to supply and noise acquired by the noise change acquiring unit 114, the power updating unit 115 updates the value of normal power being stored in the normal power storage section 102. Upon updating the power to supply, an actual update is performed after a test update is performed in advance. The power updating unit 115 includes therein a test condition determining section 121, a power testing section 122, and an update power determining section 123.

On the basis of the relation between power to supply and noise and the levels of interfering waves, acquired by the noise change acquiring unit 114, the test condition determining section 121 determines a test update value of power to supply, and a period in which a test is performed. On the basis of the information on the curved lines C1 to C4 and the levels of interfering waves, acquired by the noise change acquiring unit 114, the test condition determining section 121 derives the lower limit value of a power range in which the intensity of noise is not more than the reference value Nf. In the latter case, the test condition determining section 121 serves as a power deriving unit. The test condition determining section 121 then determines a test update value between the derived lower limit value and the current value of normal power.

For example, when the noise change acquiring unit 114 has acquired information on the curved line C1, Pt is the lower limit value of the power range in which the intensity of noise is not more than the reference value Nf. Therefore, the test condition determining section 121 determines a test update value between Pt and the normal power. When the noise change acquiring unit 114 has acquired information on the curved line C4, the test condition determining section 121 determines a test update value between Pt' and the normal power. In the case of the curved line C3, because the noise scarcely increases even when the power is low, the test condition determining section 121 determines a test update value between the lower limit value of the power to be supplied to the objective circuit element and the normal power. The lower limit value of the power to be supplied to the circuit element means the minimum value of the power necessary for stable operation of the circuit element.

Next, the test condition determining section 121 determines a period in which the power is supplied by using the test update value. In this case, the test condition determining section 121 serves as a period determining unit. In this embodiment, the test condition determining section 121 determines the supply period so that the start time and the end time of the period are within one symbol. This causes the error correcting unit 36 to easily correct errors generated in the signal from the tuner 2 due to the power supply using the test update value. In a modification, it may be judged by information on CN ratio transmitted from the demodulator 3, whether or not the timing is suitable for the test period, to determine a test power supply period. For example, if it is decided that the change in CN ratio is large and the reception condition is unstable, a supply period may be set after waiting till it is decided that the change in CN ratio is little and the reception condition is stable. In another modification, a supply period may be set over two or more symbols.

The power testing section 122 stores the test update value determined by the test condition determining section 121, in the test power storage section 103 as a test power. At a timing corresponding to the start time of the supply period determined by the test condition determining section 121, the power testing section 122 instructs the power supply unit 100 to supply to the objective circuit element the power of the value corresponding to the test power being stored in the test power storage section 103. Further, at a timing corresponding to the end time of the supply period determined by the test condition determining section 121, the power testing section 122 instructs the power supply unit 100 to end the supply of the test power and restart the supply of the normal power.

Figure 16:
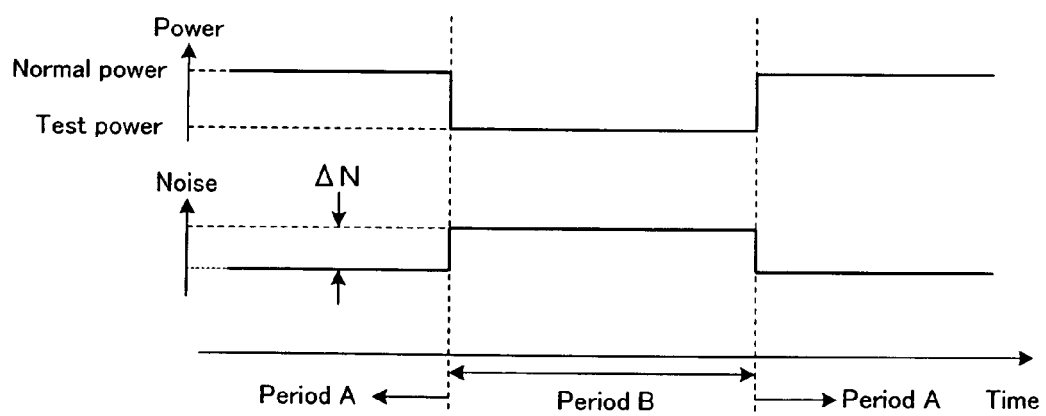
FIG. 16 is a timing chart showing a relation between the power to be supplied to a circuit element of the tuner shown in FIG. 1B and noise to be contained in a signal output from the tuner.

FIG. 16 is a timing chart showing by way of example a change in the power to be supplied to a circuit element, and a change in the noise to be contained in the signal output from the tuner 2, when the above test power is supplied. A period A represents a normal power supply period, and a period B represents a test power supply period. In the period B in which the test power is being supplied, the noise contained in the signal from the tuner 2 has increased by delta N.

On the basis of the intensity of noise to be contained in the signal from the tuner 2 due to the supply of the test power, the update power determining section 123 adopts the test update value determined by the test condition determining section 121, as an update value for the normal power. More specifically, the update power determining section 123 acquires information on CN ratio, transmitted from the demodulator 3, corresponding to the test power supply period, that is, the period B of FIG. 16. On the basis of the acquired CN ratio, which will hereinafter be referred to as test CN ratio, the update power determining section 123 judges whether or not the intensity of noise to be contained in the signal from the tuner 2 due to the supply of the test power is less than the reference value Nf. Even when the intensity of noise has been judged not to be less than the reference value Nf, the update power determining section 123 compares the above-described mean value calculated by the mean value calculating unit 116 as the normal CN ratio corresponding to the normal power supply period, that is, the period A of FIG. 16, with the test CN ratio.

On the basis of the judgment whether or not the intensity of noise is less than the reference value Nf, and the comparison between the normal and test CN ratios, the update power determining section 123 determines whether the power to supply should be updated by using the test update value determined by the test condition determining section 121. When it is decided that the power to supply should be updated, the update power determining section 123 stores in the normal power storage section 102 the test update value determined by the test condition determining section 121.

Figure 17:
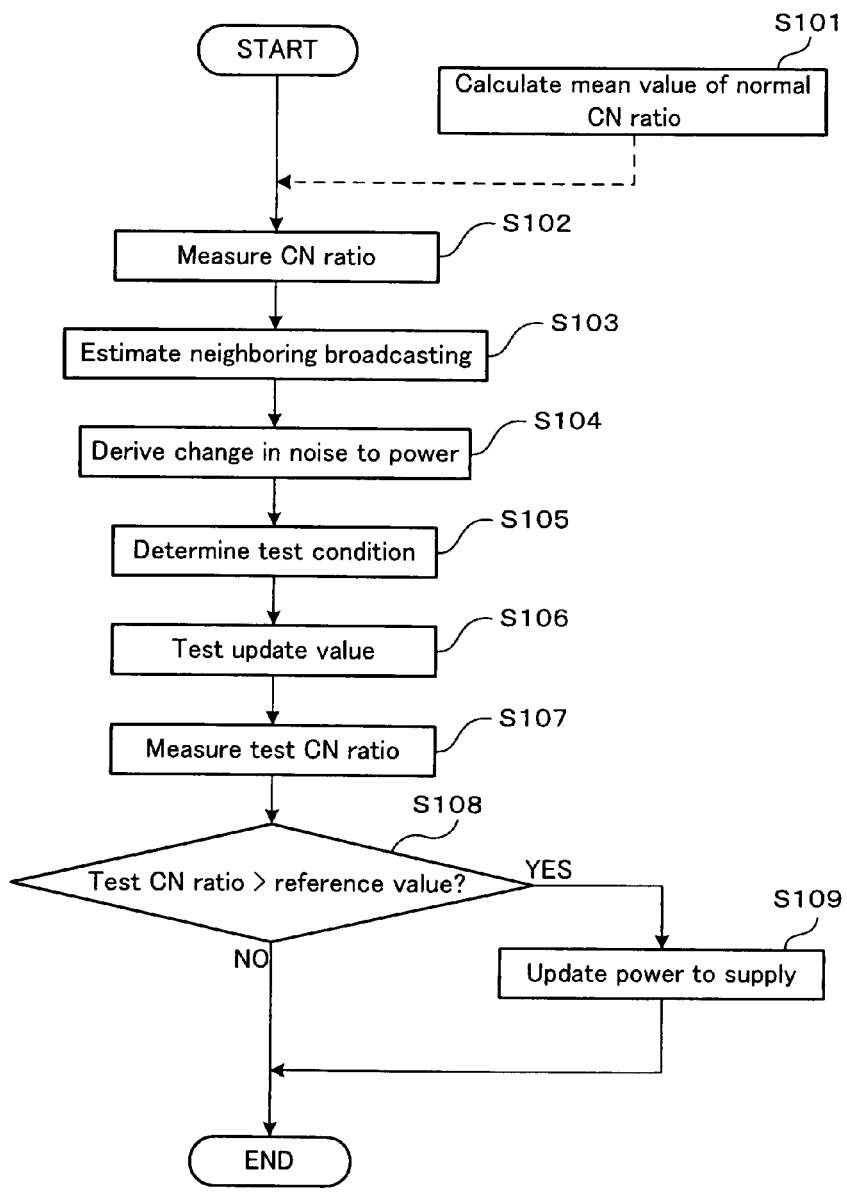
FIG. 17 is a flowchart showing a series of steps for updating the power to be supplied to a circuit element of the tuner in the cellular phone of FIG. 1A.

Next will be described a series of steps for updating the power to be supplied to each circuit element constituting the tuner 2 in the cellular phone 1000. FIG. 17 is a flowchart showing the series of steps.

First, in Step S101, the mean value calculating unit 116 calculates a mean value of CN ratios in the signal from the tuner 2 when the normal power is being supplied. A mean value of normal CN ratios has been calculated in advance before the power to supply is updated.

Next, in Step S102, the demodulator 3 measures CN ratio, that is, MER. From the measurement results, in Step S103, the neighboring broadcasting estimating unit 113 estimates what kind of broadcasting exists as an interfering wave in a frequency band on which side of the received channel. On the basis of the estimation by the neighboring broadcasting estimating unit 113, in Step S104, the noise change acquiring unit 114 acquires a change in noise to power to supply, from the storage contents in the noise form storage unit 112.

In Step S105, the test condition determining section 121 determines test conditions for updating the power to supply. More specifically, on the basis of the change in noise to power to supply, derived by the noise change acquiring unit 114, the test condition determining section 121 determines an update value for the normal power being stored in the normal power storage section 102, and determines a period in which the update value of the power is supplied to the objective circuit element as a test.

On the basis of the test conditions determined by the test condition determining section 121, in Step S106, the power testing section 122 makes the power supply unit 100 supply the update value of the normal power to the objective circuit element as a test power. In Step S107, the demodulator 3 measures test CN ratio, that is, MER. On the basis of information from the demodulator 3, in Step S108, the update power determining section 123 compares the test CN ratio with the reference value for CN ratio. The reference value for CN ratio corresponds to the reference value Nf. That is, whether or not information on test CN ratio is not less than the reference value, corresponds to whether or not noise contained in the signal from the tuner 2 due to the supply of the test power is not less than the reference value Nf.

When it is decided that the actually measured value of the test CN ratio is not more than the reference value, that is, No in Step S108, the update power determining section 123 does not perform update of the power to supply. The series of steps then end. In a modification, the steps from S102 may be repeated again.

When it is decided that the actually measured value of the test CN ratio is more than the reference value, that is, Yes in Step S108, the flow advances to Step S109, in which the update power determining section 123 performs update of the power to supply. More specifically, the update power determining section 123 stores in the normal power storage section 102 the update value determined by the test condition determining section 121. The series of steps then end. In a modification, the steps from S102 may be repeated again. In particular, when the test CN ratio largely differs from the normal CN ratio, there is a possibility that the interference condition has changed between the time of the interference estimation and the time of the test. In this case, the interference estimation must be carried out again. Therefore, the system may be modified such that the step of S101 and the steps from S102 are repeated again. On the other hand, when the normal CN ratio is low; the power to supply has been judged to be excessively low to the interference condition; and the power to supply must be increased, the system may be modified such that the update value testing steps of S105 to S108 are omitted to immediately update the power to supply.

In the embodiment constructed as described above, it is grasped that an interfering wave due to which of digital and analogue broadcastings is contained in which of the upper and lower neighboring channels neighboring the received channel, to determine an update value for the power to supply. On the other hand, in accordance with which of digital and analogue broadcastings exists as an interfering wave in which of the upper and lower neighboring channels, a relation can be grasped between the power to be supplied to each circuit element and the intensity of distortion such as intermodulation distortion to be generated in the received channel. Thus, the power consumption of each circuit element can properly be controlled within a range in which noise is not more than the reference value Nf.

In addition, in the case that the CN ratio to be contained in the signal when an update value of the power is supplied as a test power after the update value of the power to supply is determined, exceeds a predetermined reference value corresponding to the reference value Nf, the power to supply is updated to the update value. Thus, before the power to supply is updated, it is judged whether or not the update value of the power is proper. The power to supply is then updated. Therefore, the power to supply is controlled so that noise is surely suppressed to not more than the reference value Nf.

A preferred embodiment of the present invention has been described above. However, the present invention is never limited to the above-described embodiment. In the present invention, various changes, modifications, and alternatives can be made.

The above-described embodiment is on the assumption that another broadcasting channel neighboring the received channel causes an interfering wave. However, the present invention is also applicable to a case wherein analogue broadcasting contained in the same frequency band as the received channel causes an interfering wave.

In the above case, for example, the cellular phone 1000 may further have the following construction. The noise form storage unit 112 stores therein information on CN ratio distribution form not only when a neighboring frequency band contains another broadcasting channel but also when the frequency band of the received channel contains analogue broadcasting. The noise form storage unit 112 further stores therein information on a change in the intensity of noise to power to supply when the frequency band of the received channel contains analogue broadcasting. On the basis of information on CN ratio from the demodulator 3 and information being stored in the noise form storage unit 112, the neighboring broadcasting estimating unit 113 judges whether or not the frequency band of the received channel contains analogue broadcasting. In this case, the neighboring broadcasting estimating unit 113 serves as an analogue wave judging unit. When the neighboring broadcasting estimating unit 113 has decided that the frequency band of the received channel contains analogue broadcasting, the noise change acquiring unit 114 acquires a change in the intensity of noise to power to supply, from the information on CN ratio from the demodulator 3 and the information being stored in the noise form storage section 112. Further, on the basis of the change in the intensity of noise to power to supply, acquired by the noise change acquiring unit 114, the power updating unit 115 updates the power to supply.

The above-described embodiment is on the assumption that the power to be supplied to a specific circuit element is updated and controlled so as to suppress the intensity of noise to be contained in the signal finally output from the tuner 2. When the powers to be supplied to a number of circuit elements are controlled by such a method, for example, control is thinkable in which the powers to be supplied to the circuit elements are reduced in sequence within a range in which the intensity of noise to be contained in the signal from the tuner 2 does not exceed the reference value Nf, and the reduction of the power to supply is ended immediately before the noise exceeds the reference value Nf. In another modification, however, in consideration of relations between the circuit elements, the powers to supply may be controlled so that the power consumption is reduced as a whole.

For example, the above-described embodiment is on the assumption that the noise to be contained in the signal from the tuner 2 increases as the power to be supplied to the objective circuit element decreases. However, in accordance with the kinds of analogue circuits or a relation to another stage analogue circuit, it may be suitable that the power to be supplied to a circuit element is reduced while the power to be supplied to another circuit element is increased, for improving the noise to be contained in the signal output from the tuner 2. In the case of including such circuit elements, in consideration of the relations between the circuit elements, the powers to supply are preferably controlled so that the whole power consumption is actually reduced and the intensity of noise to be contained in the signal from the tuner 2 does not exceed the reference value Nf.

The above-described embodiment is on the assumption that reception conditions are good and the noise contained in the signal from the tuner 2 is less than the reference value Nf. However, it is thinkable that the noise contained in the signal from the tuner 2 exceeds the reference value Nf due to deterioration of the reception conditions. Therefore, the above-described embodiment is preferably used in combination with a construction in which control is properly performed to improve noise, for example, the power to be supplied to each circuit element is increased.

In the above-described embodiment, specific means for measuring noise contained in the signal from the tuner 2 is realized by means for measuring MER, that is, the wave equalizing unit 37. For this purpose, however, any means can suitably used if it is means for measuring values capable of evaluating the intensity of noise. For example, the mean value calculating unit 116 may calculate a mean value of normal CN ratios by using bit error rate (BER) measured by the demodulator 3.

In the above-described embodiment, the reference value Nf for noise is set as a reference for judging whether or not the error correcting unit 36 can successfully perform error correction. In a modification, however, the reference value Nf may be set as another reference that provides a range in which demodulation can sufficiently be performed. Further, in the above-described embodiment, the reference value Nf has a fixed value under any reception condition. In a modification, however, the reference value Nf may change in accordance with the reception condition. For example, in each of the curved lines C1, C2, and C4 of FIG. 12A, the intensity of noise corresponding to a position where the absolute value of the gradient of the curved line exceeds a predetermined value, may be used as the reference value for noise.

In the above-described embodiment, the noise form storage unit 112 stores therein a change in the intensity of noise to power to supply, with being related to both of information indicating which of analogue and digital broadcastings and information indicating which side of the received channel. A noise change deriving unit is realized by a construction in which a change in the intensity of noise to power to supply is acquired from the storage contents of the noise form storage unit 112 on the basis of the estimation result by the neighboring broadcasting estimating unit 113. In a modification, however, the noise change deriving unit may be realized by a construction in which means is provided that stores therein a change in the intensity of noise to power to supply, with being related to a type of distribution form of interfering waves other than analogue and digital broadcastings, and a change in the intensity of noise is acquired on the basis of the storage contents of the means.

In the above-described embodiment, the intermodulation distortions 81 and 82 as shown in FIGS. 9A and 9B are generated due to three carrier waves contained in analogue broadcasting. However, in general, of the three carrier waves, one, that is, the chrominance subcarrier wave, is lower in level than the remaining two, that is, the video and sound carrier waves. For this reason, in a modification, only interference noises generated due to two carrier waves, that is, the video and sound carrier waves, may be considered.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A digital demodulating apparatus comprising:
a plurality of circuit elements constituting a tuner that selects a frequency band out of a plurality of frequency bands and receives the signal in the selected frequency band, each signal being constituted by a plurality of carrier waves distributed in the frequency band;
a demodulator that demodulates a signal output from the tuner;
a first measuring unit that measures the intensity of noise contained in the signal from the tuner due to an interfering wave contained in the signal received by the tuner, on each carrier wave distributed in the selected frequency band;
a distribution estimating unit that estimates at least one of the distribution of interfering waves in the selected frequency band, and the distribution of interfering waves in a frequency band neighboring the selected frequency band, on the basis of the distributions of noises in the selected frequency band measured on each carrier wave by the first measuring unit;
a noise change deriving unit that derives a change in the intensity of noise to be contained in the signal from the tuner, to the power to be supplied to one of the circuit elements, on the basis of the distribution of interfering waves estimated by the distribution estimating unit, and the intensity of noise measured by the first measuring unit; and
a power updating unit that updates the value of the power to be supplied to the circuit element within a range in which the intensity of noise to be contained in the signal from the tuner is less than a noise reference value, on the basis of the change in the intensity of noise to the power to be supplied to the circuit element, derived by the noise change deriving unit.

2. The apparatus according to claim 1, wherein the distribution estimating unit estimates the distribution of interfering waves on the assumption that noises to be contained in the signal from the tuner are generated due to intermodulation distortions caused by the interfering waves.

3. The apparatus according to claim 1, wherein the power updating unit updates the power to be supplied to the circuit element to a lower value within the range in which the intensity of noise to be contained in the signal from the tuner is less than the noise reference value, when the intensity of noise being contained in the signal from the tuner is less than the noise reference value.

4. The apparatus according to claim 1, wherein the noise change deriving unit comprises:
a relation storage unit that stores therein a relation between a change in the intensity of noise to be contained in an output signal from the circuit element, to the power to be supplied to the circuit element, and the distribution of interfering waves in a frequency band; and
a noise change acquiring unit that acquires a change in the intensity of noise to be contained in the signal from the tuner, to the power to be supplied to the circuit element, on the basis of the distribution of interfering waves estimated by the distribution estimating unit, and information being stored in the relation storage unit, and
the power updating unit updates the value of the power to be supplied to the circuit element, on the basis of the change in the intensity of noise to the power to be supplied to the circuit element, acquired by the noise change acquiring unit.

5. The apparatus according to claim 1, wherein interfering waves contained in the signal received by the tuner are at least one of analogue television broadcasting waves and digital television broadcasting waves distributed in a frequency band, and the distribution estimating unit comprises an interference judging unit that judges whether interfering waves being contained in a frequency band neighboring the selected frequency band, are analogue television broadcasting waves or digital television broadcasting waves.

6. The apparatus according to claim 1, wherein the distribution estimating unit comprises an analogue wave judging unit that judges whether or not the selected frequency band contains analogue television broadcasting waves.

7. The apparatus according to claim 3, wherein the power updating unit comprises:

a power deriving unit that derives a value of the power to be supplied to the circuit element, so that the intensity of noise to be contained in the signal from the tuner when the value of the power is supplied to the circuit element, is less then the noise reference value, on the basis of the distribution of interfering waves estimated by the distribution estimating unit;

a period determining unit that determines a period during which the value of the power derived by the power deriving unit is to be supplied;

a temporally power supplying unit that supplies to the circuit element the value of the power derived by the power deriving unit during the period determined by the period determining unit; and a second measuring unit that measures the intensity of noise contained in the signal from the tuner when the temporally power supplying unit supplies to the circuit element the value of the power derived by the power deriving unit, and the power updating unit updates the power to be supplied to the circuit element, to a value not less than the value derived by the power deriving unit, and less than the value before the update, when the intensity of noise measured by the second measuring unit is less than the noise reference value.

8. The apparatus according to claim 1, wherein the apparatus further comprises an error correcting unit that corrects errors in the signal from the tuner, and the noise reference value is an upper limit value of the intensity of noise that can be corrected by the error correcting unit.

9. A digital receiver comprising:

a plurality of circuit elements constituting a tuner that selects a frequency band out of a plurality of frequency bands and receives the signal in the selected frequency band, each signal being constituted by a plurality of carrier waves distributed in each frequency band;

a demodulator that demodulates a signal output from the tuner;

a first measuring unit that measures the intensity of noise contained in the signal from the tuner due to an interfering wave contained in the signal received by the tuner, on each carrier wave distributed in the selected frequency band;

a distribution estimating unit that estimates at least one of the distribution of interfering waves in the frequency band containing the signal received by the tuner, and the distribution of interfering waves in a frequency band neighboring the selected frequency band, on the basis of the distributions of noises in the selected frequency band measured on each carrier wave by the first measuring unit;

a noise change deriving unit that derives a change in the intensity of noise to be contained in the signal from the tuner, to the power to be supplied to one of the circuit elements, on the basis of the distribution of interfering waves estimated by the distribution estimating unit, and the intensity of noise measured by the first measuring unit;

a power updating unit that updates the value of the power to be supplied to the circuit element within a range in which the intensity of noise to be contained in the signal from the tuner is less than a noise reference value, on the basis of the change in the intensity of noise to the power to be supplied to the circuit element, derived by the noise change deriving unit; and a reproducing unit that reproduces at least one of a character, an image, a sound, and a data item, on the basis of a signal received from the demodulator.

10. A controlling method of a digital demodulating apparatus comprising a plurality of circuit elements constituting a tuner that selects a frequency band out of a plurality of frequency bands and receives the signal in the selected frequency band, each signal being constituted by a plurality of carrier waves distributed in the frequency band; and a demodulator that demodulates a signal output from the tuner, the method comprising:

a first measuring step of measuring the intensity of noise contained in the signal from the tuner due to an interfering wave contained in the signal received by the tuner, on each carrier wave distributed in the selected frequency band;

a distribution estimating step of estimating at least one of the distribution of interfering waves in the selected frequency band, and the distribution of interfering waves in a frequency band neighboring the selected frequency band, on the basis of the distributions of noises in the selected frequency band measured on each carrier wave by the first measuring step;

a noise change deriving step of deriving a change in the intensity of noise to be contained in the signal from the tuner, to the power to be supplied to one of the circuit elements, on the basis of the distribution of interfering waves estimated by the distribution estimating step, and the intensity of noise measured by the first measuring step; and a power updating step of updating the value of the power to be supplied to the circuit element within a range in which the intensity of noise to be contained in the signal from the tuner is less than a noise reference value, on the basis of the change in the intensity of noise to the power to be supplied to the circuit element, derived by the noise change deriving step.

11. A computer program product for a digital demodulating apparatus comprising a plurality of circuit elements constituting a tuner that selects a frequency band out of a plurality of frequency bands and receives the signal in the selected frequency band, each signal being constituted by a plurality of carrier waves distributed in each frequency band; and a demodulator that demodulates a signal output from the tuner, the product causing the apparatus to execute:

a first measuring step of measuring the intensity of noise contained in the signal from the tuner due to an interfering wave contained in the signal received by the tuner, on each carrier wave distributed in the selected frequency band;

a distribution estimating step of estimating at least one of the distribution of interfering waves in the selected frequency band, and the distribution of interfering waves in a frequency band neighboring the selected frequency band, on the basis of the distributions of noises in the selected frequency band measured on each carrier wave by the first measuring step;

a noise change deriving step of deriving a change in the intensity of noise to be contained in the signal from the tuner, to the power to be supplied to one of the circuit elements, on the basis of the distribution of interfering waves estimated by the distribution estimating step, and the intensity of noise measured by the first measuring step; and a power updating step of updating the value of the power to be supplied to the circuit element within a range in which the intensity of noise to be contained in the signal from the tuner is less than a noise reference value, on the basis of the change in the intensity of noise to the power to be supplied to the circuit element, derived by the noise change deriving step.

12. A computer-readable recording medium recording thereon a computer program product for a digital demodulating apparatus comprising a plurality of circuit elements constituting a tuner that selects a frequency band out of a plurality of frequency bands and receives the signal in the selected frequency band, each signal being constituted by a plurality of carrier waves distributed in each frequency band; and a demodulator that demodulates a signal output from the tuner, the product causing the apparatus to execute:

a first measuring step of measuring the intensity of noise contained in the signal from the tuner due to an interfering wave contained in the signal received by the tuner, on each carrier wave distributed in the selected frequency band;

a distribution estimating step of estimating at least one of the distribution of interfering waves in the selected frequency band, and the distribution of interfering waves in a frequency band neighboring the selected frequency band, on the basis of the distributions of noises in the selected frequency band measured on each carrier wave by the first measuring step;

a noise change deriving step of deriving a change in the intensity of noise to be contained in the signal from the tuner, to the power to be supplied to one of the circuit elements, on the basis of the distribution of interfering waves estimated by the distribution estimating step, and the intensity of noise measured by the first measuring step; and a power updating step of updating the value of the power to be supplied to the circuit element within a range in which the intensity of noise to be contained in the signal from the tuner is less than a noise reference value, on the basis of the change in the intensity of noise to the power to be supplied to the circuit element, derived by the noise change deriving step.

* * * * *